(12) United States Patent
Saito et al.

(10) Patent No.: US 11,954,435 B2
(45) Date of Patent: Apr. 9, 2024

(54) TEXT GENERATION APPARATUS, TEXT GENERATION LEARNING APPARATUS, TEXT GENERATION METHOD, TEXT GENERATION LEARNING METHOD AND PROGRAM

(71) Applicant: NIPPON TELEGRAPH AND TELEPHONE CORPORATION, Tokyo (JP)

(72) Inventors: Itsumi Saito, Tokyo (JP); Kyosuke Nishida, Tokyo (JP); Kosuke Nishida, Tokyo (JP); Hisako Asano, Tokyo (JP); Junji Tomita, Tokyo (JP); Atsushi Otsuka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/764,186

(22) PCT Filed: Mar. 3, 2020

(86) PCT No.: PCT/JP2020/008955
§ 371 (c)(1),
(2) Date: Mar. 27, 2022

(87) PCT Pub. No.: WO2021/065034
PCT Pub. Date: Apr. 8, 2021

(65) Prior Publication Data
US 2022/0366140 A1 Nov. 17, 2022

(30) Foreign Application Priority Data
Oct. 2, 2019 (WO) ............... PCT/JP2019/038948

(51) Int. Cl.
*G06F 17/00* (2019.01)
*G06F 40/279* (2020.01)

(52) U.S. Cl.
CPC .................. *G06F 40/279* (2020.01)

(58) Field of Classification Search
CPC .... G06F 40/279; G06F 40/216; G06F 40/284; G06F 40/56; G06F 16/34
See application file for complete search history.

(56) References Cited

U.S. PATENT DOCUMENTS 10,521,655 B1 * 12/2019 Carbune .............. G06V 30/153
11,238,348 B2 * 2/2022 Matusov ................ G06F 40/58
(Continued)

FOREIGN PATENT DOCUMENTS

CN 108153864 A * 6/2018 .......... G06F 16/345
CN 110209801 B * 5/2021 .......... G06F 16/345

OTHER PUBLICATIONS

Hsu et al. (2018) "A Unified Model for Extractive and Abstractive Summarization using Inconsistency Loss," 10 pages.
(Continued)

*Primary Examiner* — Laurie A Ries

(57) ABSTRACT

A text generation apparatus includes a memory and a processor configured to execute acquiring a reference text based on an input text and information different from the input text; and generating a text based on the input text and the reference text, wherein the acquiring and the generating are implemented as neural networks based on learned parameters.

13 Claims, 27 Drawing Sheets

(56) References Cited

U.S. PATENT DOCUMENTS

| | | | | |
|---|---|---|---|---|
| 2007/0255552 | A1* | 11/2007 | Thiesson | G06F 16/9537 704/8 |
| 2019/0042551 | A1* | 2/2019 | Hwang | G06F 40/16 |
| 2020/0090034 | A1* | 3/2020 | Ramachandran | G06F 16/23 |
| 2020/0311341 | A1* | 10/2020 | Chaturvedi | G06N 3/04 |
| 2021/0027018 | A1* | 1/2021 | Lin | G06N 3/088 |
| 2021/0406483 | A1* | 12/2021 | Suzuki | G06F 40/30 |

OTHER PUBLICATIONS

Vaswani et al. (2017) "Attention is All You Need" Advances in Neural Information Processing Systems 30, pp. 5998-6008.

Pennington et al. (2014) "Glove: Global Vectors for Word Representation" Proceedings of the 2014 Conference on Empirical Methods in Natural Language Processing, pp. 1532-1543.

Srivastava et al. (2015) "Highway Networks" CoRR, arXiv:1505. 00387v2, 6 pages.

Saito et al. (2019) "Document summarization model that can take into consideration query/output length" 25th Annual Meeting of the association for natural language processing (NLP 2019) [online] website: https://www.anlp.jp/proceedings/annual_meeting/2019/pdf_dir/P2-11.pdf., 12 pages.

Gehrmann et al. (2018) "Bottom-up Abstractive Summarization" EMNLP, pp. 4098-4109.

Hermann et al. (2015) "Teaching Machines to Read and Comprehend" Advances in Neural Information Processing Systems 28, pp. 1693-1701.

See et al. (2017) "Get to the Point: Summarization with Pointer-Generator Networks" ACL (1), pp. 1073-1083.

Grusky et al. (2018) "Newsroom: A Dataset of 1.3 Million Summaries with Diverse Extractive Strategies" Proceedings of the 2018 Conference of the North American Chapter of the Association for Computational Linguistics: Human Language Technologies, vol. 1 (Long Papers), pp. 708-719, Association for Computational Linguistics.

Devlin et al. (2018) "Bert: Pre-training of Deep Bidirectional Transformers for Language Understanding" Proceedings of the 2018 Conference of the North American Chapter of the Association for Computational Linguistics: Human Language Technologies, CoRR, pp. 4171-4186, Association for Computational Linguistics.

Kingma et al. (2015) "Adam: A Method for Stochastic Optimization" International Conference on Learning Representations (ICLR), 15 pages.

Kikuchi et al. (2016) "Controlling Output Length in Neural Encoder-Decoders" Proceedings of the 2016 Conference on Empirical Methods in Natural Language Processing, pp. 1328-1338.

Xiong et al. (2017) "Dynamic Coattention Networks for Question Answering" Published as a conference paper at ICLR 2017, 13 pages.

Cao et al. (2018) "Retrieve, Rerank and Rewrite: Soft Template Based Neural Summarization" Proceedings of the 56th Annual Meeting of the Association for Computational Linguistics (Long Papers), pp. 152-161.

Liu et al. (2019) "Roberta: A Robustly Optimized BERT Pretraining Approach," arXiv:1907.11692v1, 13 pages.

Q. Zhou et al. (2017) " Selective Encoding for Abstractive Sentence Summarization," Proceedings of the 56th Annual Meeting of the Association for Computational Linguistics, pp. 1095-1104.

Narayan et al. (2018) "Don't Give Me the Details, Just the Summary! Topic-Aware Convolutional Neural Networks for Extreme Summarization," Proceedings of the 2018 Conference on Empirical Methods in Natural Language Processing, pp. 1797-1807.

Radford et al. (2019) "Language Models are Unsupervised Multitask Learners," Technical Report, OpenAI, 24 pages.

Liu et al. (2019) "Text Summarization with Pretrained Encoders," Proceedings of the 2019 Conference on Empirical Methods in Natural Language Processing and the 9th International Joint Conference on Natural Language Processing, pp. 3728-3738.

Lewis et al. (2019) "Bart: Denoising Sequence-to-Sequence Pretraining for Natural Language Generation, Translation, and Comprehension, " arXiv:1910.13461v1, 10 pages.

* cited by examiner

| NEWS ARTICLES | HEADLINE |
|---|---|
| Due to the influence of cold air in the sky, the atmospheric condition becomes unstable in the Kanto region and it rains ~ | There is a risk of extremely heavy rain accompanied by lightning locally in the Kanto region. |
| Make efforts to index employees' "motivation" and disclose them to investors and the like in Tokyo ~ | Calculate employees' "motivated deviation values" and provide them to investors and the like |
| American space shuttle "Columbia" disintegrated in the skies February 1 upon re-entry into the atmosphere, killing all seven crew members ~ | In-fright disintegration: What happened to space shuttle |

(2)

| HEADLINE |
|---|
| There is a risk of extremely heavy rain accompanied by lightning locally in the Kanto region. |
| Calculate employees' "motivated deviation values" and provide them to investors and the like |
| In-fright disintegration: What happened to space shuttle |

# TEXT GENERATION APPARATUS, TEXT GENERATION LEARNING APPARATUS, TEXT GENERATION METHOD, TEXT GENERATION LEARNING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/008955, filed on 3 Mar. 2020, which application claims priority to and the benefit of International Patent Application No. PCT/JP2019/038948, filed on 2 Oct. 2019, the disclosures of which are hereby incorporated herein by reference in their entireties.

TECHNICAL FIELD

The present invention relates to a text generation apparatus, a text generation training apparatus, a text generation method, a text generation training method, and a program.

BACKGROUND ART

Text generation techniques based on neural networks have advanced. Such a generation technique is a technique of receiving text as an input and generating a predetermined target text (for example, a summary) based on a pre-trained neural network model.

For example, NPL 1 proposes a method in which a word-level importance (attention) obtained by multiplying the importance of a text included in an input document and the importance of a word is reflected in text generation.

CITATION LIST

Non Patent Literature

NPL 1: Wan-Ting Hsu, Chieh-Kai Lin, Ming-Ying Lee, Kerui Min, Jing Tang, Min Sun. 2018. A Unified Model for Extractive and Abstractive Summarization using Inconsistency Loss.

SUMMARY OF THE INVENTION

Technical Problem

However, in NPL 1, information to be considered when generating a text is given in the form of an importance score, a length embedding, or the like and cannot be given as text.

The present invention has been made in view of the above points and it is an object of the present invention to make it possible to add information to be considered when generating a text as text.

Means for Solving the Problem

Thus, to achieve the object, a text generation apparatus includes a content selection unit configured to acquire a reference text based on an input text and information different from the input text and a generation unit configured to generate a text based on the input text and the reference text, wherein the content selection unit and the generation unit are neural networks based on learned parameters.

Effects of the Invention

Information to be considered when generating a text can be added as text.

BRIEF DESCRIPTION OF DRAWINGS

FIG. 12 is a diagram illustrating an exemplary configuration of a knowledge source database 20.

DESCRIPTION OF EMBODIMENTS

Figure 1:
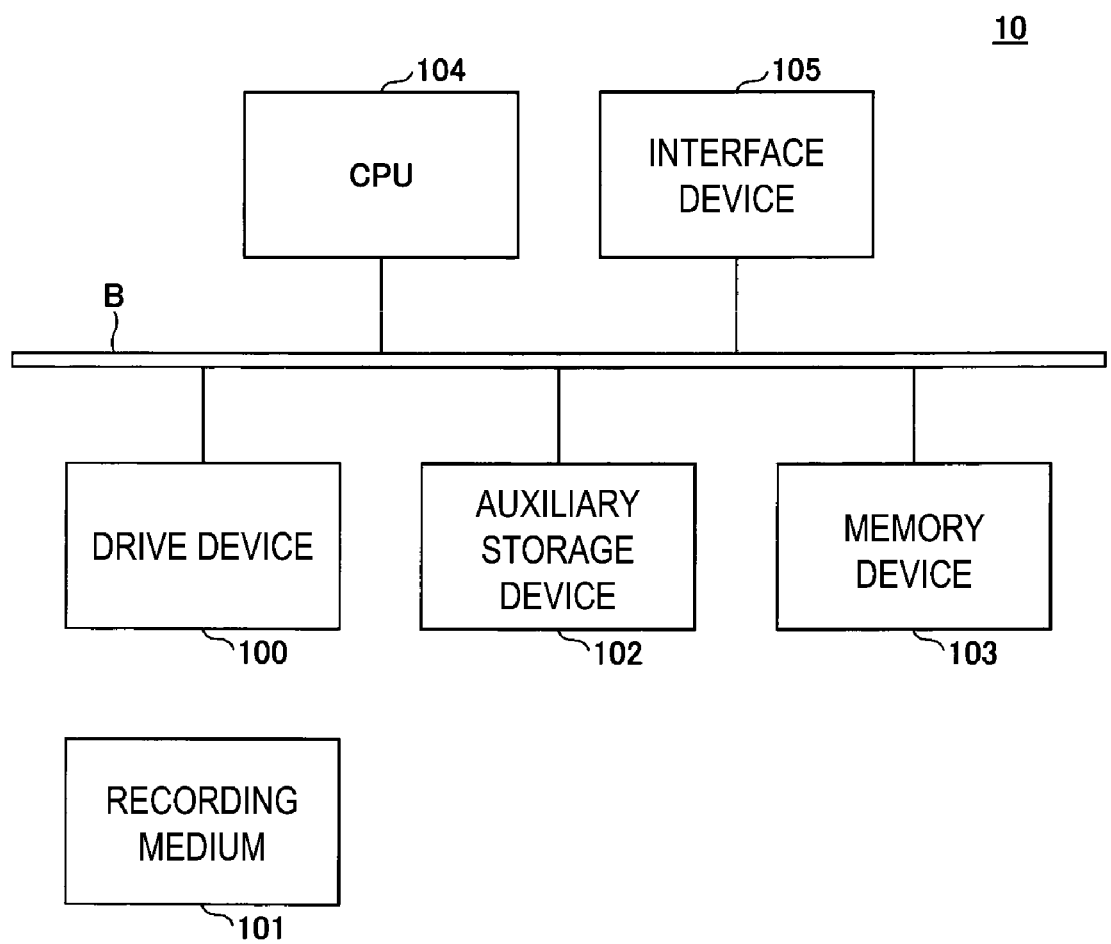
FIG. 1 is a diagram illustrating an exemplary hardware configuration of a text generation apparatus 10 according to a first embodiment.

Hereinafter, embodiments of the present invention will be described with reference to the drawings. FIG. 1 is a diagram illustrating an exemplary hardware configuration of a text generation apparatus 10 according to a first embodiment. The text generation apparatus 10 of FIG. 1 includes a drive device 100, an auxiliary storage device 102, a memory device 103, a CPU 104, an interface device 105, and the like which are connected to each other by a bus B.

A program that implements processing of the text generation apparatus 10 is provided through a recording medium 101 such as a CD-ROM. When the recording medium 101 storing the program is set in the drive device 100, the program is installed on the auxiliary storage device 102 from the recording medium 101 via the drive device 100. However, it is not always necessary to install the program from the recording medium 101 and the program may be downloaded from another computer via a network. The auxiliary storage device 102 stores the installed program and also stores necessary files, data, and the like.

The memory device 103 reads the program from the auxiliary storage device 102 and stores it upon receiving an instruction to activate the program. The CPU 104 executes a function relating to the text generation apparatus 10 according to the program stored in the memory device 103. The interface device 105 is used as an interface for connecting to a network.

The text generation apparatus 10 may include a graphics processing unit (GPU) instead of the CPU 104 or together with the CPU 104.

Figure 2:
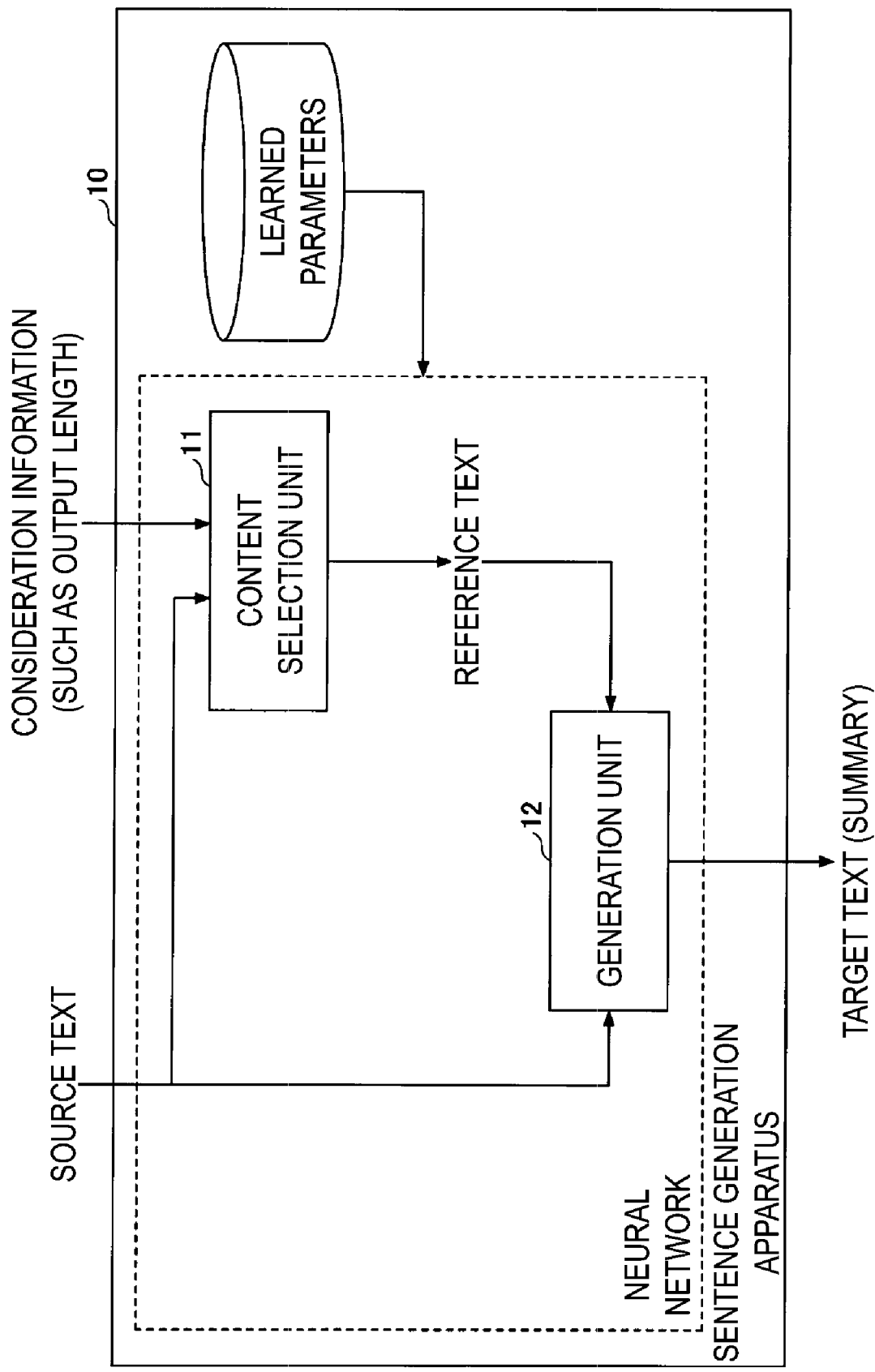
FIG. 2 is a diagram illustrating an exemplary functional configuration of the text generation apparatus 10 according to the first embodiment.

FIG. 2 is a diagram illustrating an exemplary functional configuration of the text generation apparatus 10 according to the first embodiment. In FIG. 2, the text generation apparatus 10 includes a content selection unit 11 and a generation unit 12. Each of these units is implemented by a process of causing the CPU 104 or the GPU to execute one or more programs installed in the text generation apparatus 10.

A source text (an input text) and information different from the input text (a condition or information to be considered in summarizing the source text (hereinafter referred to as "consideration information")) are input to the text generation apparatus 10 as text. The first embodiment will be described with respect to an example in which the length (the number of words) K of a text (a summary) that the text generation apparatus 10 generates based on a source text (hereinafter referred to as an "output length K") is adopted as consideration information.

The content selection unit 11 estimates the importance [0, 1] of each word included in the source text. The content selection unit 11 extracts a predetermined number of words (up to a top K word in terms of importance) based on the output length K and outputs the result of concatenating the extracted words as a reference text. The importance is the probability of the word being included in a summary.

The generation unit 12 generates a target text (a summary) based on the source text and the reference text output from the content selection unit 11.

The content selection unit 11 and the generation unit 12 are based on neural networks that execute a text generation task (summarization in the present embodiment). Specifically, the content selection unit 11 is based on Bidirectional Encoder Representations from Transformers (BERT) and the generation unit 12 is based on a Transformer-based pointer generator model of "Ashish Vaswani, Noam Shazeer, Niki Parmar, Jakob Uszkoreit, Llion Jones, Aidan N Gomez, Lukasz Kaiser, and Illia Polosukhin. 2017. Attention is all you need. In Advances in Neural Information Processing Systems 30, pages 5998-6008" (hereinafter referred to as "Reference 1"). Thus, the content selection unit 11 and the generation unit 12 execute processing based on learned values of the training parameters (learned parameters) of the neural networks.

Figure 3:
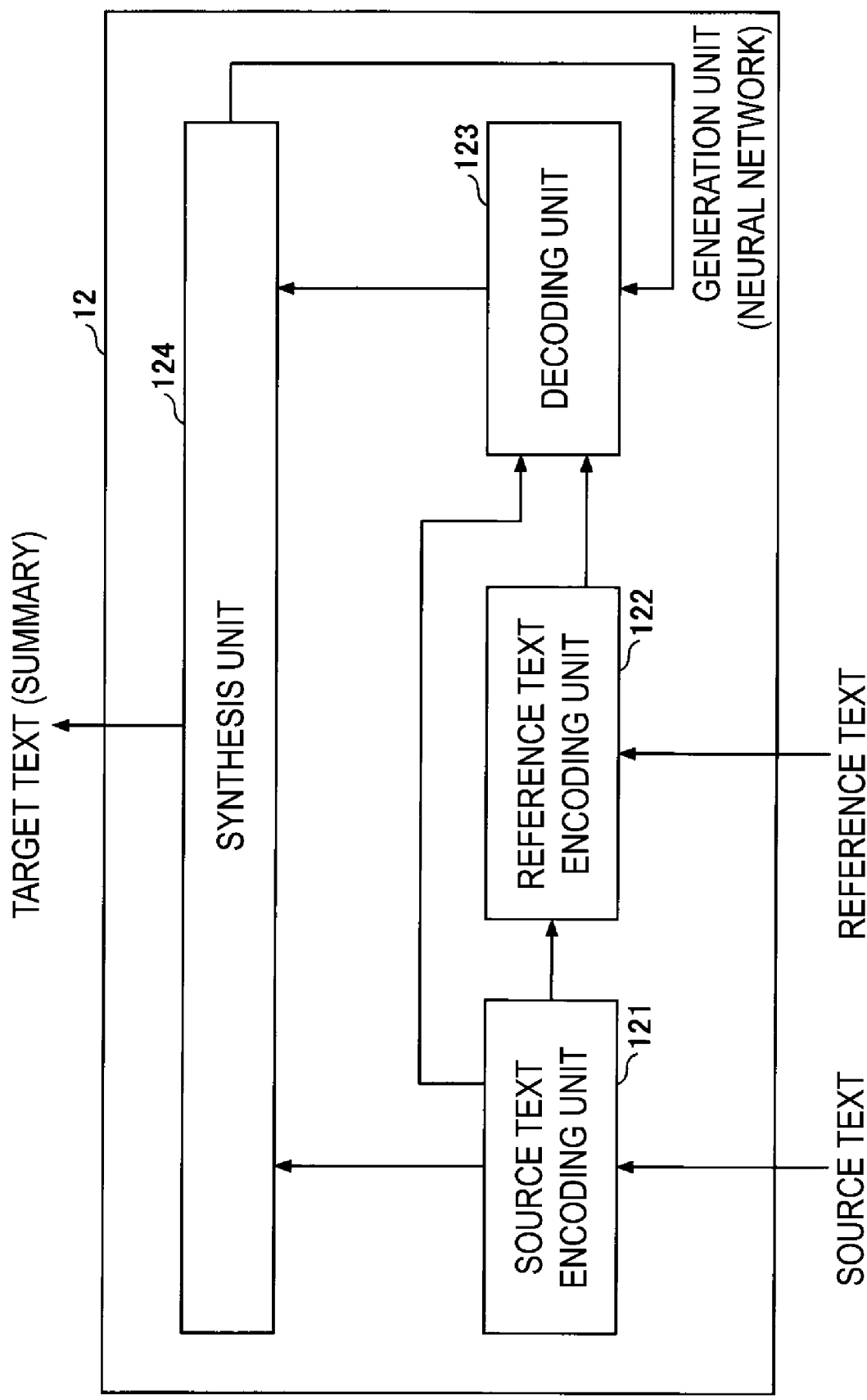
FIG. 3 is a diagram illustrating an exemplary configuration of a generation unit 12 in the first embodiment.

FIG. 3 is a diagram illustrating an exemplary configuration of the generation unit 12 in the first embodiment. As illustrated in FIG. 3, the generation unit 12 includes a source text encoding unit 121, a reference text encoding unit 122, a decoding unit 123, a synthesis unit 124, and the like. The function of each component will be described later.

Figure 4:
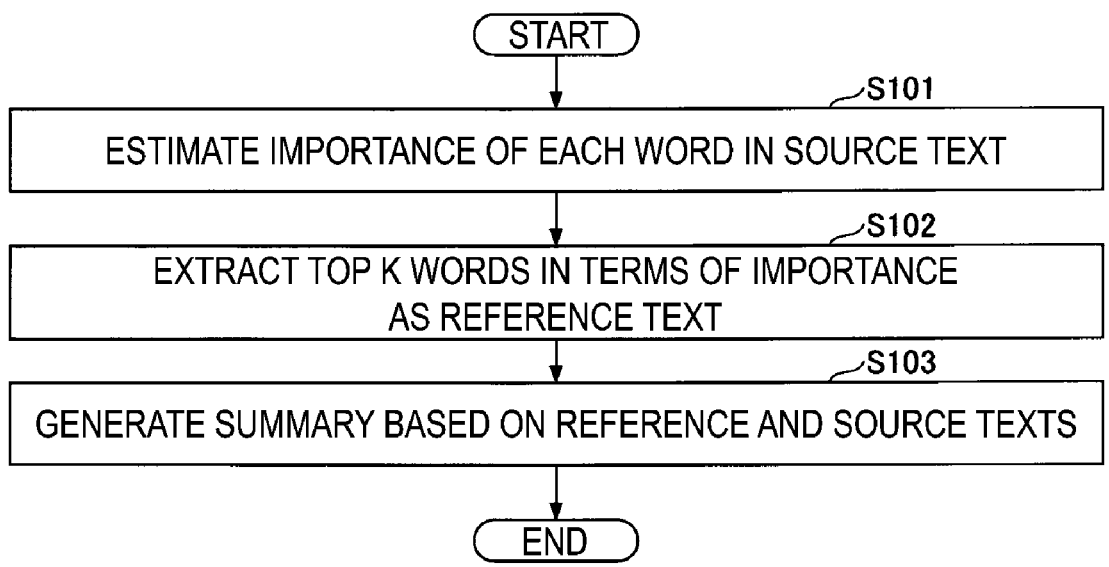
FIG. 4 is a flowchart for explaining an example of a processing procedure executed by the text generation apparatus 10 according to the first embodiment.

Hereinafter, a processing procedure executed by the text generation apparatus 10 will be described. FIG. 4 is a flowchart for explaining an example of the processing procedure executed by the text generation apparatus 10 in the first embodiment.

In step S101, the content selection unit 11 estimates (calculates) the importance of each word included in a source text $X^C$.

In the present embodiment, the content selection unit 11 uses Bidirectional Encoder Representations from Transformers (BERT). BERT has achieved the state-of-the-art (SOTA) in many sequence tagging tasks. In the present embodiment, the content selection unit 11 divides the source text into words using a BERT tokenizer, a fine-tuned BERT model, and a feed forward network added specifically for the task. The content selection unit 11 calculates the importance $p^{ext}_n$ of each word $x^C_n$ based on the following equation. $p^{ext}_n$ indicates the importance of an n-th word $x^C_n$ in the source text $X^C$.

[Math. 1]

$$p^{ext}_n = \sigma(W_1^T \text{BERT}(X^C)_n + b_1) \quad (1)$$

where BERT( ) is the last hidden state of a pre-trained BERT.

$$W_1 \in \mathcal{R}^{d_{bert} \times 1} \quad \text{[Math. 2]}$$

and $b_1$ are training parameters of the content selection unit 11. $\sigma$ is a sigmoid function. $d_{bert}$ is the dimensionality of the last hidden state of the pre-trained BERT.

Figure 5:
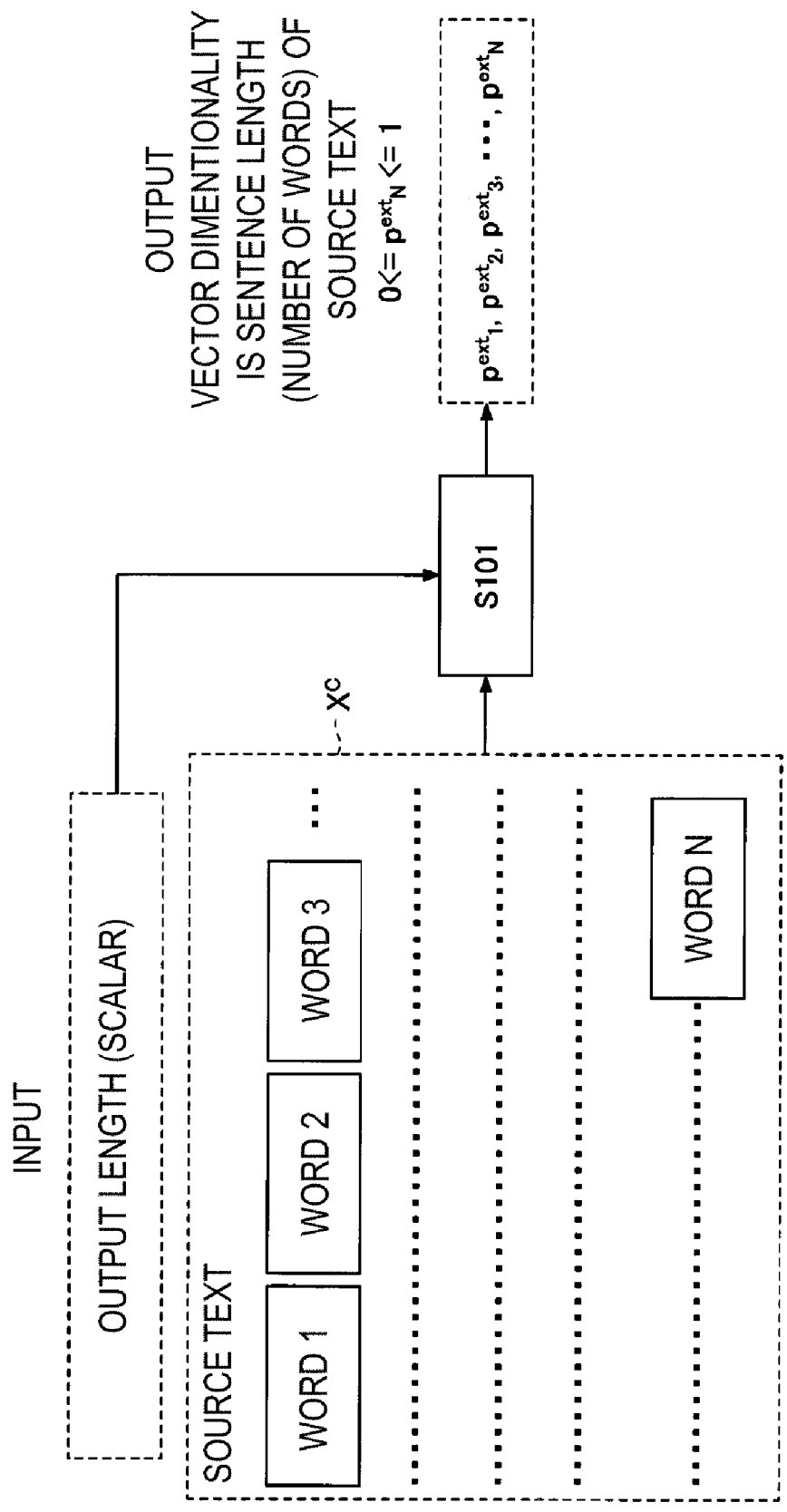
FIG. 5 is a diagram for explaining estimation of the importance of each word.

FIG. 5 is a diagram for explaining the estimation of the importance of each word. FIG. 5 illustrates an example in which the source text $X^C$ includes N words. In this case, the content selection unit 11 calculates the importance $p^{ext}_n$ of each of the N words.

Subsequently, the content selection unit 11 extracts a set (word sequence) of K words in order from a word with the highest importance $p^{ext}_n$ (S102). Here, K is the output length as described above. The extracted word sequence is output to the generation unit 12 as a reference text.

In step S101, the importance may be calculated as $p^{extw}_n$ of the following equation (2). In this case, a set (word sequence) of K words is extracted as a reference text in order from the word with the highest $p^{ext_w}_n$.

[Math. 3]

$$p^{ext_w}_n = p^{ext}_n \cdot p^{ext}_{S_j} \quad (2)$$

$$p^{ext}_{S_j} = \frac{1}{N_{S_j}} \sum_{l:x_n \in S_j} p^{ext}_n$$

where $N_{S_j}$ is the number of words in a j-th text $S_j \in X^C$. By using this weighting, a text-level importance can be incorporated and a more fluid reference text can be extracted as compared with the case in which only the word-level importance $p^{ext}_n$ is used.

According to the present embodiment, the length of a summary can be controlled according to the number of words in a reference text, regardless of whether equation (1) or equation (2) is used.

Subsequently, the generation unit 12 generates a summary based on the reference text and the source text $X^C$ (S103).

Figure 6:
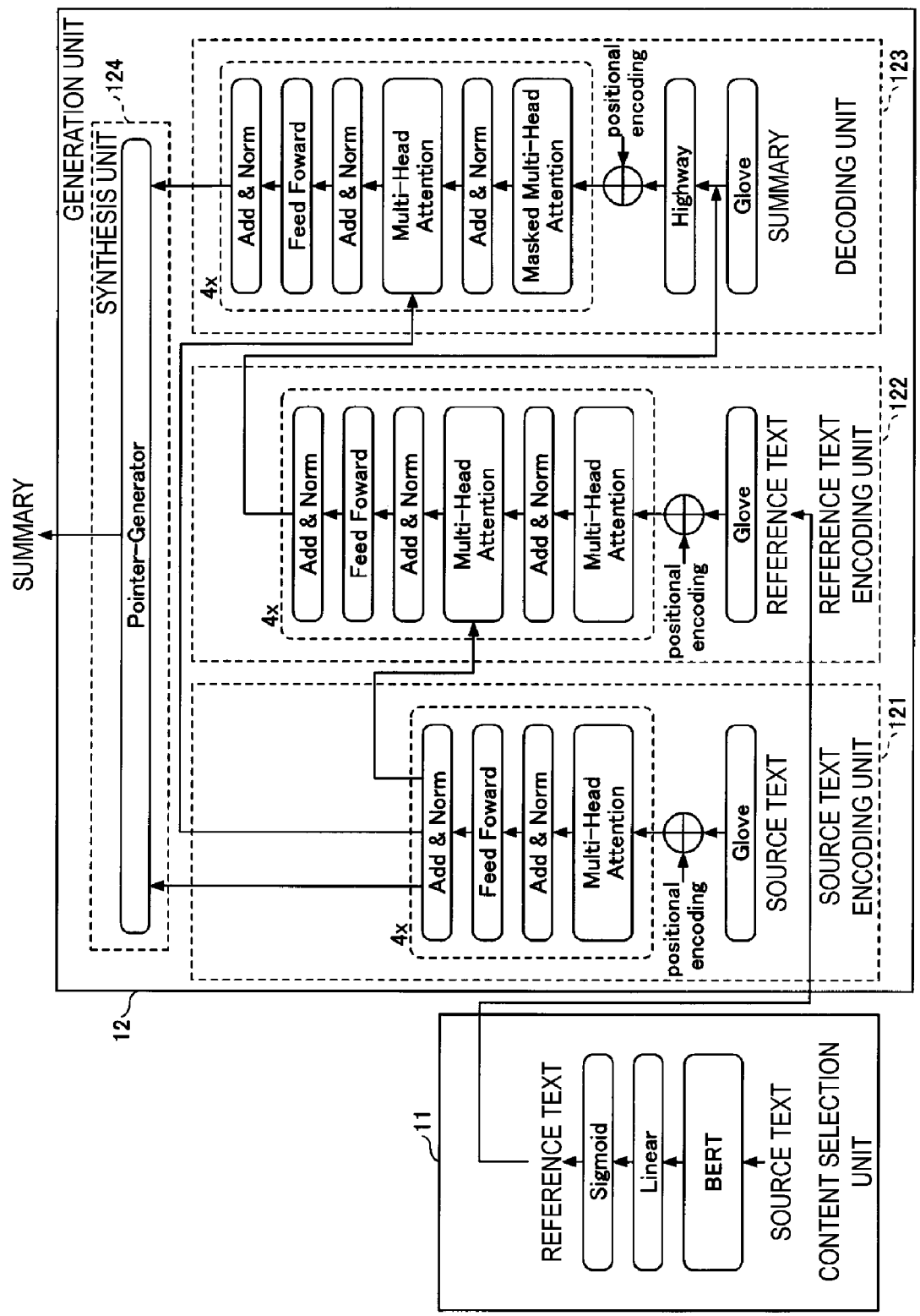
FIG. 6 is a diagram for explaining processing performed by the generation unit 12 in the first embodiment.

Details of step S103 will be described below. FIG. 6 is a diagram for explaining processing performed by the generation unit 12 in the first embodiment.

Source Text Encoding Unit 121

The source text encoding unit 121 receives the source text $X^C$ and outputs $$M^C \in \mathcal{R}^{d_{model} \times N} \quad \text{[Math. 4]}$$

where $d_{model}$ is the model size of the Transformer.

An embedding layer of the source text encoding unit 121 projects one-hot vectors of words $x^C_n$ (of size V) onto a $d_{word}$-dimensional vector array using a pre-trained weight matrix $$W^e \in \mathcal{R}^{d_{word} \times V} \quad \text{[Math. 5]}$$

such as that of Glove ("Jeffrey Pennington, Richard Socher, and Christopher D. Manning. 2014. Glove: Global vectors for word representation. In EMNLP" (hereinafter referred to as "Reference 2")).

The embedding layer then uses a fully connected layer to map each $d_{word}$-dimensional word embedding to a $d_{model}$-dimensional vector and passes the mapped embedding to a ReLU function. The embedding layer also adds positional encoding to the word embedding (Reference 1).

Each Transformer encoder block of the source text encoding unit 121 has the same architecture as that of Reference 1. Each Transformer encoder block includes a multi-head self-attention network and a fully connected feed forward network. Each network applies residual connections.

Reference Text Encoding Unit 122

The reference text encoding unit 122 receives a reference text $X^P$ which is a sequence of top K words in terms of importance. The words in the reference text $X^P$ are rearranged in the order of appearance in the source text. The output of the reference text encoding unit 122 is as follows.

$$M^P \in \mathcal{R}^{d_{model} \times K} \quad \text{[Math. 6]}$$

The embedding layer of the reference text encoding unit 122 is the same as the embedding layer of the source text encoding unit 121 except for the input.

Each Transformer decoder block of the reference text encoding unit 122 is almost the same as that of Reference 1. The reference text encoding unit 122 has an interactive alignment layer that performs multi-head attention at the output of the encoder stack in addition to two sub-layers of each encoder layer. Residual connections are applied in the same way as in the Transformer encoder block of the source text encoding unit 121.

Decoding Unit 123

The decoding unit 123 receives $M^P$ and the word sequence of a summary Y generated through an autoregressive process. Here, $M^P_t$ is used as a guide vector for generating the summary. The output of the decoding unit 123 is as follows.

$$M^S_t \in \mathcal{R}^{d_{model}} \quad \text{[Math. 7]}$$

where t∈T is each decoding step.

An embedding layer of the decoding unit 123 uses a pre-trained weight matrix $W^e_t$ to map a t-th word $y_t$ in the summary Y to $M^y_t$. The embedding layer concatenates $M^y_t$ and $M^P_t$ and delivers the result to a highway network ("Rupesh Kumar Srivastava, Klaus Greff, and Jurgen Schmidhuber. 2015. Highway networks. CoRR, 1505.00387."). Thus, the concatenated embedding is as follows.

$$W^{merge}_t = \text{Highway}[M^y_t; M^P_t] \in \mathcal{R}^{d_{word} + d_{model}} \quad \text{[Math. 8]}$$

$W^{merge}$ is mapped to a model-dimensional vector and passes through a ReLU as in the source text encoding unit 121 and the reference text encoding unit 122. Positional encoding is added to the mapped vector.

Each Transformer decoder block of the decoding unit 123 has the same architecture as that of Reference 1. This component is used stepwise during testing, such that a subsequent mask is used.

Synthesis Unit 124

Using a pointer-generator, the synthesis unit 124 selects information from any of the source text and the decoding unit 123 based on copy distributions and generates a summary based on the selected information.

In the present embodiment, a first attention head of the decoding unit 123 is used as a copy distribution. Thus, a final vocabulary distribution is as follows.

[Math. 9]

$$p(y_t \mid y_{1:t-1}, x) = p(z_t = 1 \mid y_{1:t-1}, x) \times p(y_t \mid z_t = 1, y_{1:t-1}, x) + p(z_t = 0 \mid y_{1:t-1}, x) \times p(y_t \mid z_t = 0, y_{1:t-1}, x)$$

where the generation probability is defined as follows.

$$p(y_t \mid z_t = 0, y_{1:t-1}, x) = \text{softmax}(W_v(M^S_t + b)) \quad \text{[Math. 10]}$$

where $W_v \in \mathcal{R}^{d_{model} \times V}$ $p(y_t \mid z_t = 1, y_{1:t-1}, x)$ is a copy distribution. $p(z_t)$ is a copy probability representing a weight as to whether $y_t$ is copied from the source text. $p(z_t)$ is defined as follows.

$$p(z_t) = \text{sigmoid}(W_c(M^S_t + b)) \quad \text{[Math. 11]}$$

where $W_c \in \mathcal{R}^{d_{model} \times 1}$

The estimation of the importance in step S101 of FIG. 4 may be implemented using a method disclosed in "Tsumi Saito, Kyosuke Nishida, Atsushi Otsuka, Mitsutoshi Nishida, Hisako Asano, and Junji Tomita, 'Document summarization model that can take into consideration query/output length,' 25th Annual Meeting of the association for natural language processing (NLP 2019), https://www.anlp.jp/proceedings/annual_meeting/2019/pdf_dir/P2-11.pdf."

Figure 7:
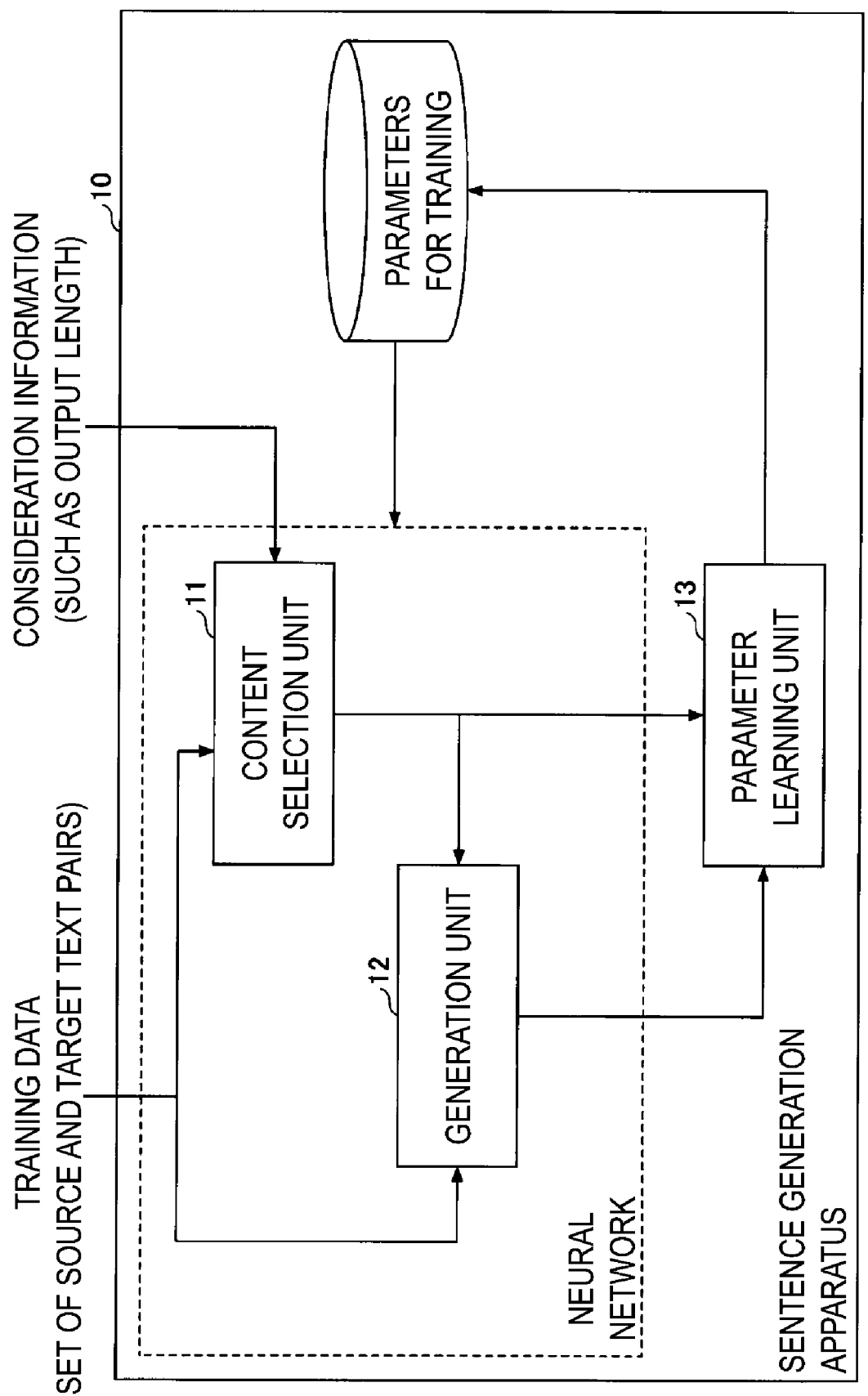
FIG. 7 is a diagram illustrating an exemplary functional configuration of the text generation apparatus 10 for training according to the first embodiment.

Next, training will be described. FIG. 7 is a diagram illustrating an exemplary functional configuration of the text generation apparatus 10 for training according to the first embodiment. In FIG. 7, the same parts as those in FIG. 3 are denoted by the same reference signs and description thereof will be omitted.

The text generation apparatus 10 for training further includes a parameter learning unit 13. The parameter learning unit 13 is implemented by a process of causing the CPU 104 or the GPU to execute one or more programs installed in the text generation apparatus 10.

Training Data for Content Selection Unit 11 For training of the content selection unit 11, for example, pseudo-training data such as that of "Sebastian Gehrmann, Yuntian Deng, and Alexander Rush. 2018. Bottom-up abstractive summarization. In EMNLP, pages 4098-4109" (hereinafter referred to as "Reference 3") is used as training data. The training data includes pairs $(x^C_n, r_n)$ of words $x^C_n$ and labels $r_n$ of the entire source text $x^C_n$. $r_n$ is 1 if $x^C_n$ is selected for a summary. To automatically create such pairs of data, first, an Oracle source text $S^{oracle}$ that maximizes the ROUGE-R score is extracted in the same way as in "Wan-Ting Hsu, Chieh-Kai Lin, Ming-Ying Lee, Kerui Min, Jing Tang, and Min Sun. 2018. A unified model for extractive and abstractive summarization using inconsistency loss. In ACL (1), pages 132-141." Then, a dynamic programming algorithm is used to calculate the word-by-word alignment between a reference summary and $S^{oracle}$. Finally, all aligned words are labeled 1 and the other words are labeled 0.

Training Data for Generation Unit 12

For training of the generation unit 12, it is necessary to create 3-tuple data $(X^C, X^p, Y)$ of a source text, a gold set of extracted words, and a target text (summary). Specifically, for training of the generation unit 12, first, the content selection unit 11 is used to select an Oracle text $S^{oracle}$ and $p^{ext}_n$ is scored for all words $x^C_n$ of $S^{oracle}$. Specifically, the content selection unit 11 is used to select an Oracle text $S^{oracle}$ and $p^{ext}_n$ is scored for all words $x^C_n$ of $S^{oracle}$. Next, top K words are selected according to $p^{ext}_n$. The original order of words is maintained at $X^p$. K is calculated using a reference summary length T. To obtain a natural summary that is close to a desired length, the reference summary length T is quantized into discrete size intervals. In the present embodiment, the size interval is set to 5.

Loss Function of Content Selection Unit 11

Because the process executed by the content selection unit 11 is a simple binary classification task, a binary cross-entropy loss is used.

[Math. 12]

$$L_{ext} = -\frac{1}{MN}\sum_{m=1}^{M}\sum_{n=1}^{N}\left(\begin{array}{c}r_n \log p_n^{ext} + \\ (1-r_n)\log(1-p_n^{ext})\end{array}\right)$$

where M is the number of training examples.

Loss Function of Generation Unit 12

A main loss for the generation unit 12 is a cross-entropy loss.

[Math. 13]

$$L_{gen}^{main} = -\frac{1}{MT}\sum_{m=1}^{M}\sum_{t=1}^{T}\log p(y_t \mid y_{1:t-1}, x)$$

Further, attention guide losses for the reference text encoding unit 122 and the decoding unit 123 are added. These attention guide losses are designed to guide an estimated attention distribution to a reference attention.

[Math. 14]

$$L_{attn}^{sum} = -\frac{1}{MTN}\sum_{m=1}^{M}\sum_{t=1}^{T}\sum_{n=1}^{N}r_{n(t)}\log p(a_t^{sum})$$

$$L_{attn}^{sal} = -\frac{1}{MKN}\sum_{m=1}^{M}\sum_{k=1}^{K}\sum_{n=1}^{N}r_{n(t)}\log p(a_l^{sal})$$

$p(a^{sum}_t)$ and $p(a^{sal}_t)$ are the top attention heads of the decoding unit 123 and the reference text encoding unit 122, respectively. n(t) indicates the absolute position in the source text corresponding to the t-th word in the summary word sequence.

The overall loss for the generation unit 12 is a linear combination of the above three losses.

$$L_{gen} = L_{gen}^{main} + \lambda_1 L_{attn}^{sum} + \lambda_2 L_{attn}^{sal} \qquad [\text{Math. 15}]$$

$\lambda_1$ and $\lambda_2$ were set to 0.5 in an experiment which will be described below.

Then, the parameter learning unit 13 evaluates processing results of the content selection unit 11 and the generation unit 12 that are based on the training data described above by using the above loss function and updates training parameters of the content selection unit 11 and the generation unit 12 until the loss function converges. Values of the training parameters at which the loss function converges are used as learned parameters.

Experiment

An experiment performed according to the first embodiment will be described.

Dataset

The CNN-DM dataset ("Karl Moritz Hermann, Tomas Kocisky, Edward Grefenstette, Lasse Espeholt, Will Kay, Mustafa Suleyman, and Phil Blunsom. 2015. Teaching machines to read and comprehend. In Advances in Neural Information Processing Systems 28, pages 1693-1701" (hereinafter referred to as "Reference 4")) which is a standard corpus for news summaries was used. Summaries are bullets for articles displayed on websites. Following "Abigail See, Peter J. Liu, and Christopher D. Manning. 2017. Get to the point: Summarization with pointer-generator networks. In ACL (1), pages 1073-1083. (2017)," a non-anonymized version of the corpus was used, each source document was truncated into 400 tokens, and each target summary was truncated into 120 tokens. The dataset contains 286,817 training pairs, 13,368 validation pairs, and 11,487 test pairs. The Newsroom dataset was used to evaluate the domain transfer capability of the model ("Max Grusky, Mor Naaman, and Yoav Artzi. 2018. Newsroom: A dataset of 1.3 million summaries with diverse extractive strategies. In Proceedings of the 2018 Conference of the North American Chapter of the Association for Computational Linguistics: Human Language Technologies, Volume 1 (Long Papers), pages 708-719. Association for Computational Linguistics.").

While using the generation unit 12 trained on the CNN/DM dataset, the content selection unit 11 was trained on the Newsroom dataset (Reference 3). Newsroom contains a variety of news sources (38 different news sites). For training of the content selection unit 11, 300,000 training pairs were sampled from all training data. The size of test pairs was 106,349.

Model Configuration

The same configuration was used for the two datasets. The content selection unit 11 used a pre-trained BERT Large model ("Jacob Devlin, Ming-Wei Chang, Kenton Lee, and Kristina Toutanova. 2018. Bert: Pre-training of deep bidirectional Transformers for language understanding. CoRR."). The BERT was fine-tuned for two epochs. Default settings were used for other parameters for fine-tuning. The content selection unit 11 and the generation unit 12 used pre-trained 300-dimensional GloVe embeddings. The model size $d_{model}$ of the Transformer was set to 512. The Transformer includes four Transformer blocks for the source text encoding unit 121, the reference text encoding unit 122, and the decoding unit 123. The number of heads was 8 and the number of dimensions of the feed forward network was 2048. The dropout rate was set to 0.2. An Adam optimizer with $\beta_1=0.9$, $\beta_2=0.98$, and $\varepsilon=e^{-9}$ ("Diederik P. Kingma and Jimmy Ba. 2015. Adam: A method for stochastic optimization. In International Conference on Learning Representations (ICLR)") was used for optimization. Following Reference 1, the learning rate was changed during training. The number of warm-up steps was set to 8,000. The size of the input vocabulary was set to 100,000 and the size of the output vocabulary was set to 1,000.

Experimental Results

Table 1 shows ROUGE scores of NPL 1 and the first embodiment.

TABLE 1

|                  | R-1   | R-2   | R-L   |
|------------------|-------|-------|-------|
| NPL 1            | 40.68 | 17.97 | 37.13 |
| FIRST EMBODIMENT | 41.41 | 19.00 | 38.01 |

According to Table 1, it can be seen that the first embodiment outperforms NPL 1 in all aspects of ROUGE-1 (R-1), ROUGE-2 (R-2), and ROUGE-L (R-L).

According to the first embodiment, information to be considered when generating a text (the output length) can be added as text as described above. As a result, a source text (an input text) can be treated equivalently to features of the information to be considered.

In addition, the length is controlled using the length embedding in "Yuta Kikuchi, Graham Neubig, Ryohei Sasano, Hiroya Takamura, and Manabu Okumura. 2016. Controlling output length in neural encoder-decoders. In Proceedings of the 2016 Conference on Empirical Methods in Natural Language Processing, pages 1328-1338. Association for Computational Linguistics." In this method, the importance of a word according to the length cannot be explicitly taken into consideration and information to be included in an output text cannot be appropriately controlled in the control of the length. On the other hand, according to the present embodiment, it is possible to more directly generate a highly accurate summary while controlling important information according to the output length K without using the length embedding.

Next, a second embodiment will be described. The second embodiment will be described with respect to points different from the first embodiment. Points not particularly mentioned in the second embodiment may be the same as those in the first embodiment.

Figure 8:
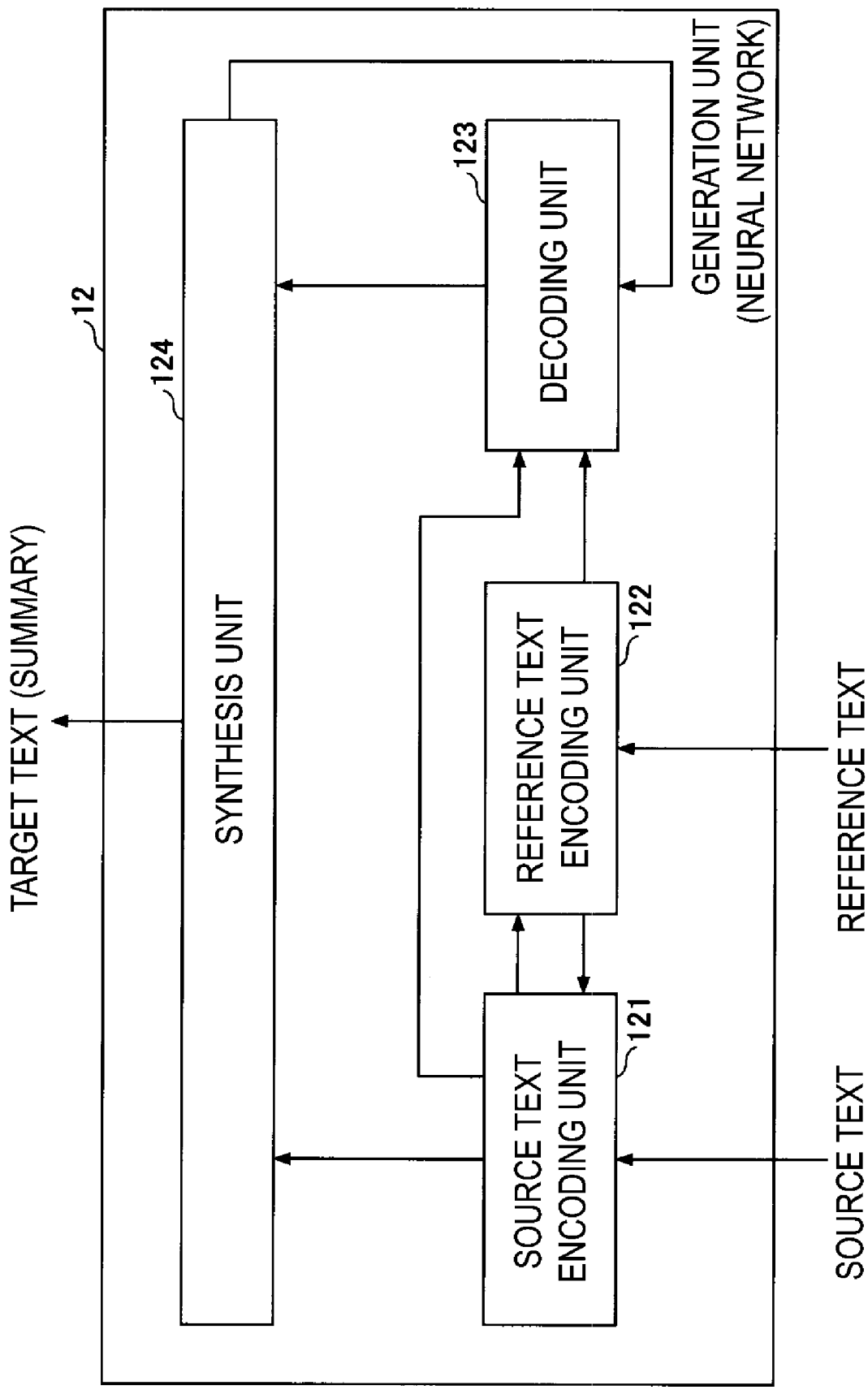
FIG. 8 is a diagram illustrating an exemplary configuration of a generation unit 12 in a second embodiment.

FIG. 8 is a diagram illustrating an exemplary configuration of the generation unit 12 in the second embodiment. In FIG. 8, the same parts as those in FIG. 3 are denoted by the same reference signs and description thereof will be omitted.

FIG. 8 differs from FIG. 3 in that the source text encoding unit 121 and the reference text encoding unit 122 cross-reference each other. This cross-reference is performed when source and reference texts are encoded.

The second embodiment differs in the configuration of the generation unit 12 as described above. Thus, the second embodiment also differs from the first embodiment in the procedure for generating a summary based on the reference text and the source text $X^C$ in step S103.

Figure 9:
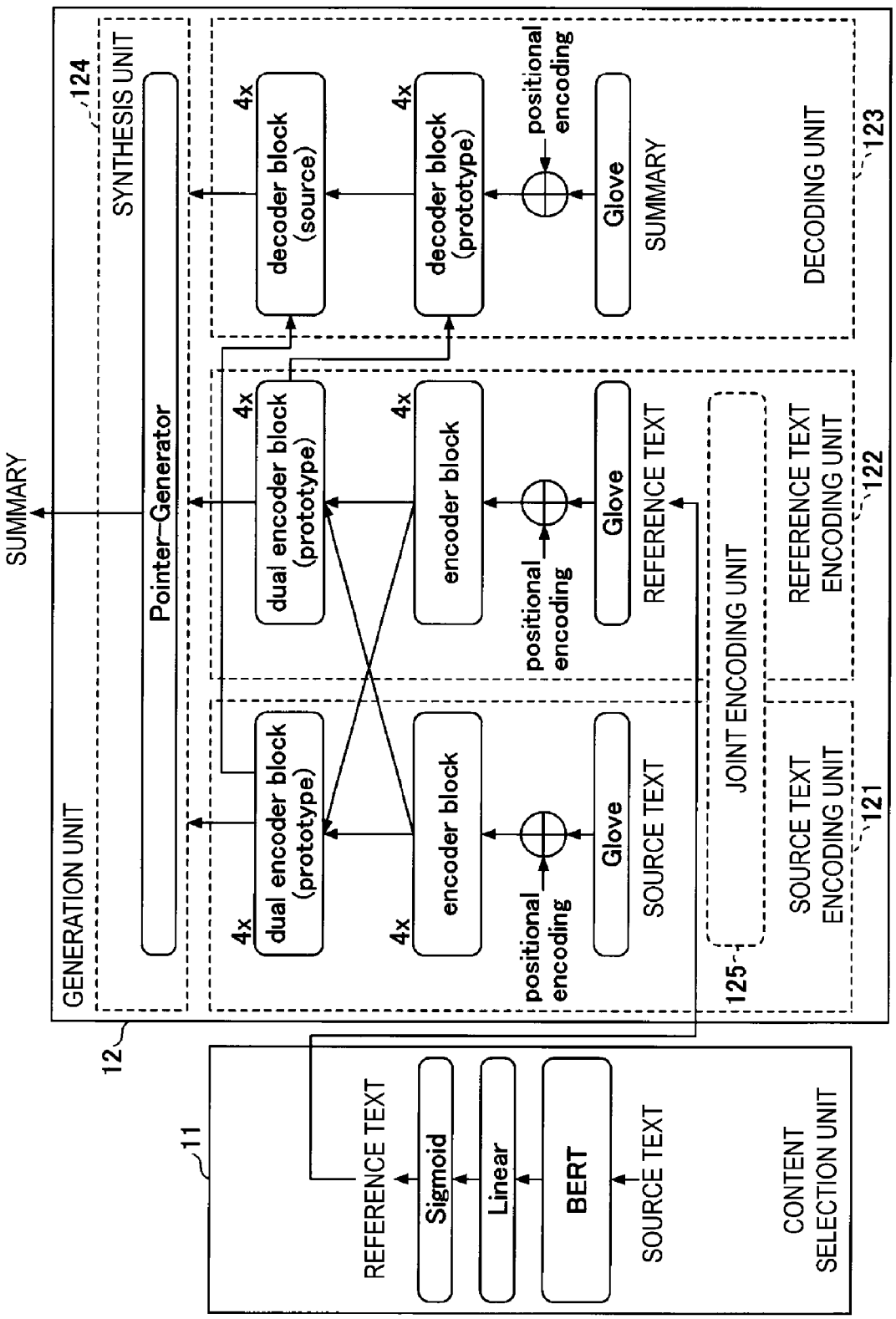
FIG. 9 is a diagram for explaining processing performed by the generation unit 12 in the second embodiment.

FIG. 9 is a diagram for explaining processing performed by the generation unit 12 in the second embodiment. In the second embodiment, the source text encoding unit 121 and the reference text encoding unit 122 are collectively referred to as a joint encoding unit 125 as illustrated in FIG. 9.

Joint Encoding Unit 125

First, an embedding layer of the joint encoding unit 125 projects one-hot vectors of words $X^C_1$ (of size V) onto a $d_{word}$-dimensional vector array using a pre-trained weight matrix $$W^e \in \mathcal{R}^{d_{word} \times V} \quad \text{[Math. 16]}$$

such as that of Glove (Reference 2).

The embedding layer then uses a fully connected layer to map each $d_{word}$-dimensional word embedding to a $d_{model}$-dimensional vector and passes the mapped embedding to a ReLU function. The embedding layer also adds positional encoding to the word embedding (Reference 1).

Transformer encoder blocks of the joint encoding unit 125 encode the embedded source and reference texts as a stack of Transformer blocks. Each Transformer encoder block has the same architecture as that of Reference 1. The Transformer encoder block includes two subcomponents, a multi-head self-attention network and a fully connected feed forward network. Each network applies residual connections. In this model, both the source text and the reference text are individually encoded in the encoder stack. The encoding outputs of the source text and the reference text are represented respectively by $$E_s^C \in \mathcal{R}^{d_{model} \times L} \text{ and } E_s^P \in \mathcal{R}^{d_{model} \times K} \quad \text{[Math. 17]}$$

Transformer dual encoder blocks in the joint encoding unit 125 calculate the interactive attention between the encoded source and reference texts. Specifically, the Transformer dual encoder blocks first encode the source and reference texts and then perform multi-head attention on the other outputs of the encoder stack (that is, $E^C_s$ and $E^P_s$). The outputs of the dual encoder stack of the source and reference texts are represented respectively by $$M^C \in \mathcal{R}^{d_{model} \times L} \text{ and } M^P \in \mathcal{R}^{d_{model} \times K} \quad \text{[Math. 18]}$$

Decoding Unit 123

An embedding layer of the decoding unit 123 receives the word sequence of a summary Y generated through an autoregressive process. At each decoding step t, the decoding unit 123 projects one-hot vectors of words $y_t$ in the same way as the embedding layer of the joint encoding unit 125.

Each Transformer decoder block of the decoding unit 123 has the same architecture as that of Reference 1. This component is used stepwise during testing, such that a subsequent mask is used. The decoding unit 123 uses a stack of decoder blocks to perform multi-head attention on a representation $M^P$ obtained by encoding the reference text. The decoding unit 123 uses another stack of decoder blocks to perform multi-head attention on a representation $M^C$ obtained by encoding the source text, on top of the first stack. The first stack is to rewrite the reference text and the second is to complement the rewritten reference text with the original source information. The output of the stacks is $$M^S \in \mathcal{R}^{d_{model} \times T}$$ [Math. 19]

Synthesis Unit 124

Using a pointer-generator, the synthesis unit 124 selects information from any of the source text, the reference text, and the decoding unit 123 based on copy distributions and generates a summary based on the selected information.

The copy distributions of the source text and the reference text are as follows.

[Math. 20]

$$p_p(y_t) = \sum_{k:x_k^P=y_t} \alpha_{tk}^P, \quad p_c(y_t) = \sum_{l:x_n^C=y_t} \alpha_{tn}^C$$

where $\alpha_{tk}^P$ and $\alpha_{tn}^C$ are the first attention head of the last block of the first stack of the decoding unit 123 and the first attention head of the last block of the second stack of the decoding unit 123, respectively.

A final vocabulary distribution is as follows.

[Math. 21]

$$p(y_t) = \lambda_g p_g(y_t) + \lambda_c p_c(y_t) + \lambda_p p_p(y_t)$$

$$\lambda_g, \lambda_c, \lambda_p = \text{softmax}(W^v[M_t^S; c_t^C; c_t^P] + b^v)$$

$$c_t^C = \sum_l \alpha_{tn}^C M_n^C$$

$$c_t^P = \sum_k \alpha_{tk}^P M_k^P$$

$$p_g(y_t) = \text{softmax}(W^g(M_t^S) + b^g)$$

where $W^v \in \mathcal{R}^{3 \times 3d_{model}}$, $b^v \in \mathcal{R}^3$, $W^g \in \mathcal{R}^{d_{model} \times V}$ and $b^g \in \mathcal{R}^V$ are learnable parameters.

Next, training will be described. The parameter learning unit 13 functions during training in the same way as in the first embodiment.

Training Data for Content Selection Unit 11 and Generation Unit 12

Training data for each of the content selection unit 11 and the generation unit 12 may be the same as in the first embodiment.

Loss Function of Content Selection Unit 11

Because the process executed by the content selection unit 11 is a simple binary classification task, a binary cross-entropy loss is used.

[Math. 22]

$$L_{ext} = -\frac{1}{MN} \sum_{m=1}^{M} \sum_{n=1}^{N} \left( r_n \log p_n^{ext} + (1-r_n)\log(1-p_n^{ext}) \right)$$

where M is the number of training examples.

Loss Function of Generation Unit 12

A main loss for the generation unit 12 is a cross-entropy loss.

[Math. 23]

$$L_{gen}^{main} = -\frac{1}{MT} \sum_{m=1}^{M} \sum_{t=1}^{T} \log p(y_t \mid y_{1:t-1}, X^C, X^P)$$

Further, attention guide losses for the decoding unit 123 are added. These attention guide losses are designed to guide an estimated attention distribution to a reference attention.

[Math. 24]

$$L_{attn}^{sum} = -\frac{1}{MT} \sum_{m=1}^{M} \sum_{t=1}^{T} \log \alpha_{tn,n(t)}^C$$

$$L_{attn}^{proto} = -\frac{1}{MT} \sum_{m=1}^{M} \sum_{t=1}^{T} \log \alpha_{tn,n(t)}^{proto}$$

$\alpha_{t,n(t)}^{proto}$ is the first attention head of the last block of the joint encoder stack for the reference text. n(t) indicates the absolute position in the source text corresponding to the t-th word in the summary word sequence.

The overall loss for the generation unit 12 is a linear combination of the above three losses.

$$L_{gen} = L_{gen}^{main} + \lambda_1 L_{attn}^{sum} + \lambda_2 L_{attn}^{proto} \quad \text{[Math. 25]}$$

$\lambda_1$ and $\lambda_2$ were set to 0.5 in an experiment which will be described below.

Then, the parameter learning unit 13 evaluates processing results of the content selection unit 11 and the generation unit 12 that are based on the training data described above by using the above loss function and updates training parameters of the content selection unit 11 and the generation unit 12 until the loss function converges. Values of the training parameters at which the loss function converges are used as learned parameters.

Experiment

An experiment performed according to the second embodiment will be described. Datasets used in the experiment of the second embodiment were the same as those of the first embodiment.

Experimental Results

Table 2 shows ROUGE scores of NPL 1 and the second embodiment.

TABLE 2

|  | R-1 | R-2 | R-L |
| --- | --- | --- | --- |
| NPL 1 | 40.68 | 17.97 | 37.13 |
| SECOND EMBODIMENT | 42.38 | 19.97 | 39.16 |

According to Table 2, it can be seen that the second embodiment outperforms NPL 1 in all aspects of ROUGE-1 (R-1), ROUGE-2 (R-2), and ROUGE-L (R-L).

According to the second embodiment, the same advantages as those of the first embodiment can be achieved as described above.

Further, according to the second embodiment, words included in a reference text can also be used to generate a summary.

Next, a third embodiment will be described. The third embodiment will be described with respect to points different from the first embodiment. Points not particularly mentioned in the third embodiment may be the same as those in the first embodiment.

The third embodiment will be described with respect to an example in which summarization in consideration of external knowledge is possible and important information in an input text can be directly controlled according to the external knowledge. Here, in the third embodiment, information similar to a source text is retrieved from a knowledge source database (DB) 20 that stores external knowledge which is a text format document (a set of texts) and K texts in the retrieved information which have high relevance to the source text and a relevance measure indicating the degree of relevance as a reference text are used.

Figure 10:
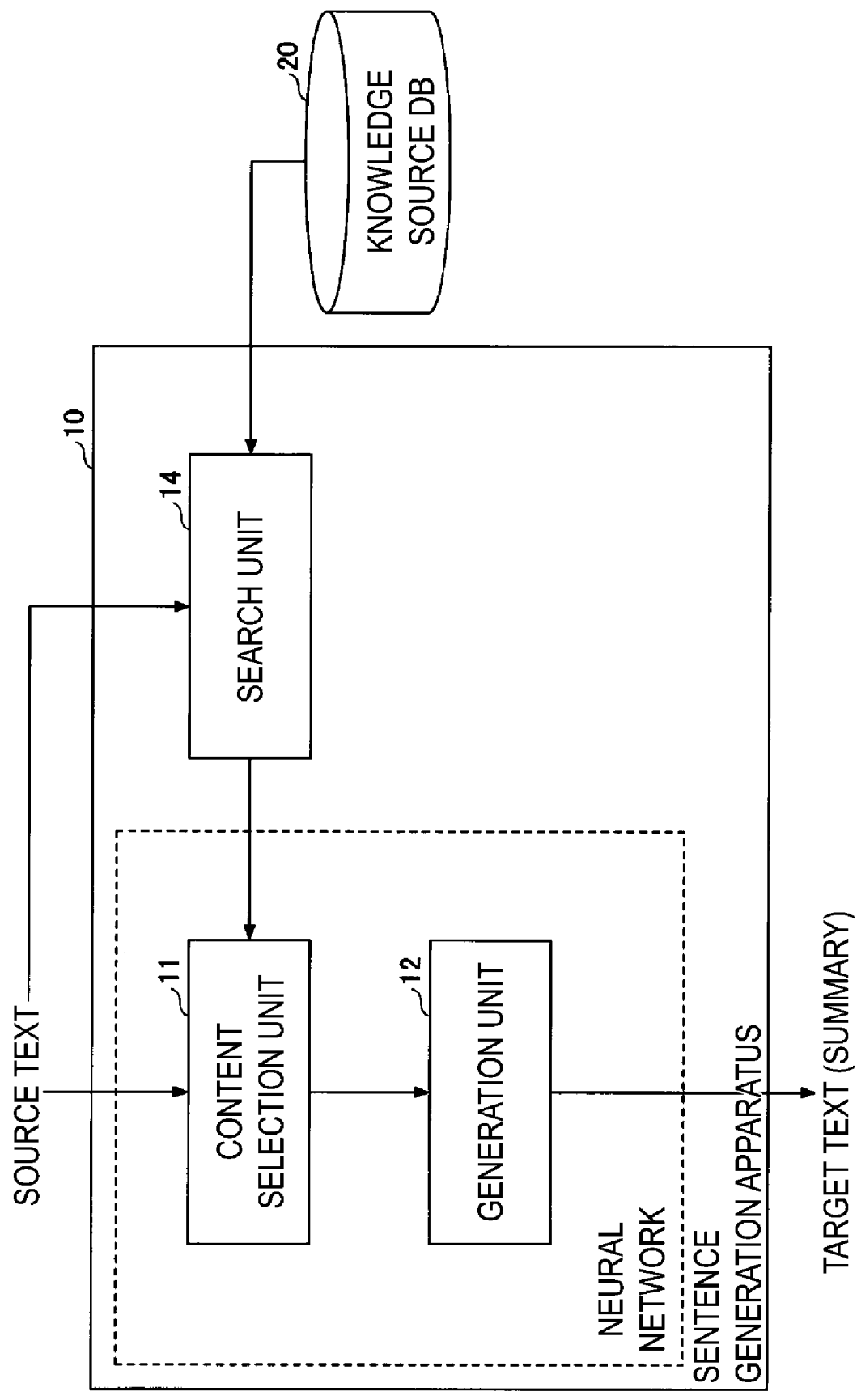
FIG. 10 is a diagram illustrating an exemplary functional configuration of a text generation apparatus 10 according to a third embodiment.

FIG. 10 is a diagram illustrating an exemplary functional configuration of the text generation apparatus 10 according to the third embodiment. In FIG. 10, the same or corresponding parts as those in FIG. 2 are denoted by the same reference signs and description thereof will be omitted as appropriate.

In FIG. 10, the text generation apparatus 10 further includes a search unit 14. The search unit 14 retrieves information from the knowledge source database 20 using the source text as a query. The information retrieved by the search unit 14 corresponds to consideration information in each of the above embodiments. That is, in the third embodiment, consideration information is external knowledge (a reference text created from external knowledge based on the relevance to a source text).

Figure 11:
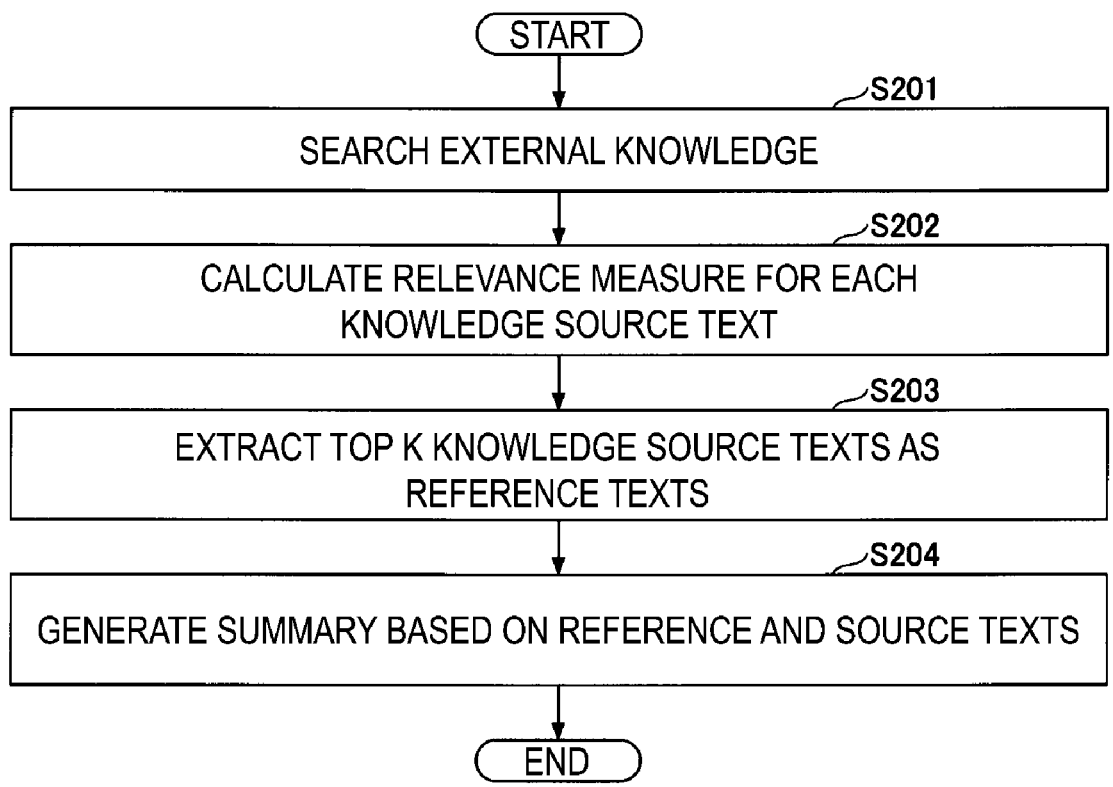
FIG. 11 is a flowchart for explaining an example of a processing procedure executed by the text generation apparatus 10 according to the third embodiment.

FIG. 11 is a flowchart for explaining an example of a processing procedure executed by the text generation apparatus 10 according to the third embodiment.

In step S201, the search unit 14 searches the knowledge source database 20 using a source text as a query.

FIG. 12 is a diagram illustrating an exemplary configuration of the knowledge source database 20. FIG. 12 illustrates examples (1) and (2).

(1) illustrates an example in which pairs of documents, each pair of documents serving as input and output texts of a task executed by the text generation apparatus 10, are stored in the knowledge source database 20. FIG. 12(1) illustrates an example in which pairs of news articles and headlines (or summaries) are stored as an example of the case where the task is generation of a title or a summary.

(2) illustrates an example in which documents at one side of the pairs (only headlines in the example of FIG. 12) are stored in the knowledge source database 20.

In any case, it is assumed that a large amount of knowledge (information) is stored in the knowledge source database 20.

In step S201, the search unit 14 searches the knowledge source database 20 for a group of documents, the number of which is a re-rankable number K'(about 30 to 1000) which will be described later, using a high-speed search module such as Elasticsearch.

When the knowledge source database 20 is configured as illustrated in (1), any of the search methods, search based on the similarity between the source text and headlines, search based on the similarity between the source text and news articles, or search based on the similarity between the source text and news articles+headlines, can be considered.

On the other hand, when the knowledge source database 20 is configured as illustrated in (2), search based on the similarity between the source text and headlines can be considered. The similarity is a known index for evaluating the similarity between documents such as the number of same words included or the cosine similarity.

In the present embodiment, in any of the cases (1) and (2), it is assumed that K' headlines are obtained as search results based on the similarity and the headlines are each a text. Hereinafter, K' texts (headlines) which are the search results are each referred to as a "knowledge source text."

Subsequently, for each knowledge source text, the content selection unit 11 calculates a text-level relevance measure (a relevance measure of each knowledge source text) using a relevance measure calculation model which is a pre-trained neural network (S202). The relevance measure calculation model may form a part of the content selection unit 11. The relevance measure is an index indicating the degree of relevance, similarity, or correlation with the source text and corresponds to the importance in the first or second embodiment.

Figure 13:
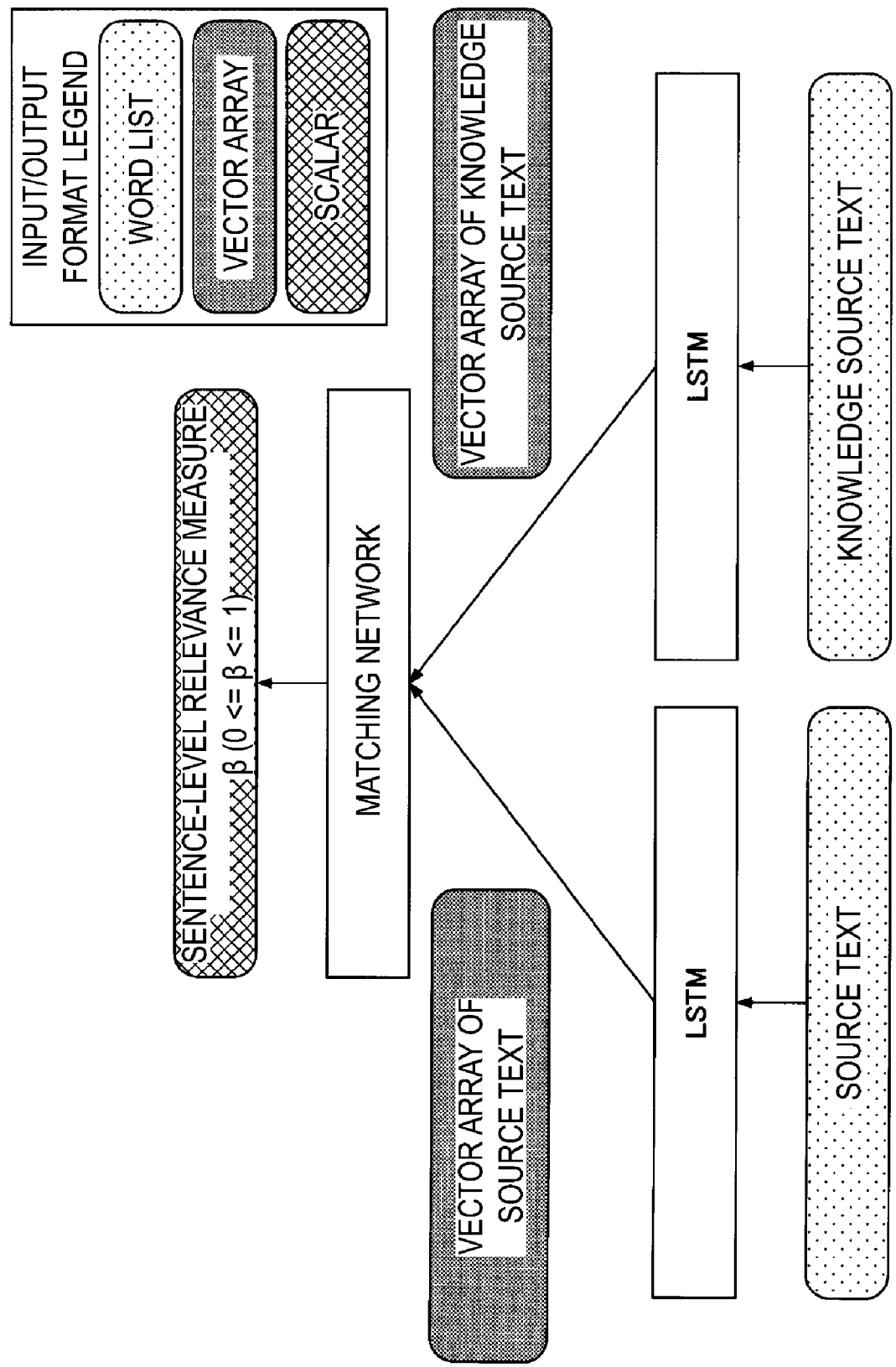
FIG. 13 is a diagram for explaining a first example of a relevance measure calculation model.

FIG. 13 is a diagram for explaining a first example of the relevance measure calculation model. A source text and a knowledge source text are input to respective LSTMs as illustrated in FIG. 13. Each LSTM transforms each word included in the corresponding text into a vector of a predetermined dimension. As a result, each text becomes an array of vectors of the predetermined dimension. The number of vectors (that is, the length of the vector array) I is determined based on the number of words. For example, I is set to 300 or the like, and when the number of words is less than 300, predetermined words such as "PAD" are used to make the number of words equal to 300. Here, for convenience, it is assumed that the number of words is equal to the number of vectors. Thus, it is assumed that the length of a vector array which is the result of conversion of a text including I words is I.

A matching network takes the vector array of the source text and the vector array of the knowledge source text as inputs and calculates a text-level relevance measure $\beta$ ($0 \le \beta \le 1$) for the knowledge source text. For example, a co-attention network ("Caiming Xiong, Victor Zhong, Richard Socher, DYNAMIC COATTENTION NETWORKS FOR QUESTION ANSWERING, Published as a conference paper at ICLR 2017") may be used as the matching network.

Figure 14:
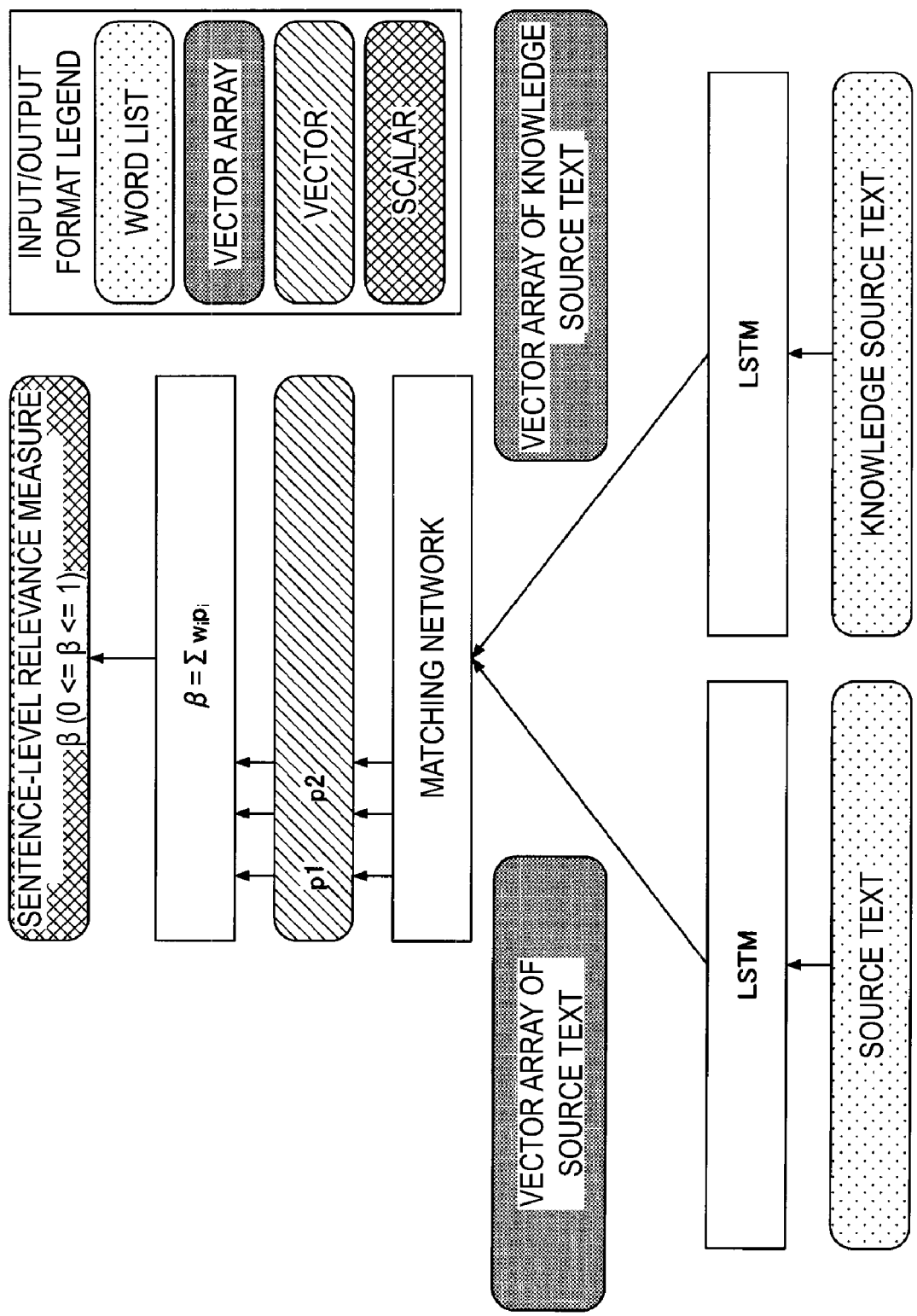
FIG. 14 is a diagram for explaining a second example of a relevance measure calculation model.

FIG. 14 is a diagram for explaining a second example of the relevance measure calculation model. FIG. 14 will be described with respect to only points different from FIG. 13.

FIG. 14 differs in that the matching network calculates a word-level relevance measure $p_i$ ($0 \le p_i \le 1$) for each word i included in the knowledge source text (that is, for each element of the vector array). Such a matching network may also be implemented using a co-attention network.

The relevance measure calculation model calculates the text-level relevance measure $\beta$ by a weighted sum of word-level relevance measures $p_i$. Thus, $\beta = \Sigma w_i p_i$ (where i= 1, . . . , number of words). $w_i$ is a learnable parameter of the neural network.

The process described with reference to FIG. 13 or 14 is performed on K' knowledge source texts. Thus, the relevance measure $\beta$ is calculated for each knowledge source text.

Subsequently, the content selection unit 11 extracts, as a reference text, the result of concatenating a predetermined number (K) of two or more knowledge source texts in descending order of the relevance measure $\beta$ calculated using the method as illustrated in FIG. 13 or 14 (S203).

Subsequently, the generation unit 12 generates a summary based on the reference text and the source text (S204). Details of processing executed by the generation unit 12 may be basically the same as those of the first or second embodiment. However, the probability $\alpha^p_{tk}$ of attention to each word of the reference text may be weighted as follows using the word-level relevance measure or the text-level relevance measure. In the above description, the variable $\alpha^p_{tk}$ is defined as an attention head. However, because reference is made to the value of $\alpha^p_{tk}$ here, $\alpha^p_{tk}$ corresponds to the attention probability. In the following, the text-level relevance measure or the word-level relevance measure will be represented by $\beta$ for convenience. Either the word-level relevance measure or the text-level relevance measure may be used or both may be used.

When the text-level relevance measure is used, the attention probability $\alpha^P_{tk}$ is updated, for example, as follows.

[Math. 26]

$$\hat{\alpha}^P_{tk} = \frac{\alpha^P_{tk} \times \beta_{S(k)}}{\sum_k \alpha^P_{tk} \times \beta_{S(k)}}$$

The left side is the attention probability after the update. $\beta s(k)$ is the relevance measure $\beta$ of a text S including a word k.

When the word-level relevance measure is used, the word-level relevance measure $p_i$ corresponding to the word k is applied to $\beta s(k)$ in the above equation. When both are used, it is conceivable, for example, to weight the word-level relevance measure by the text-level relevance measure as in the above equation (2). $p_i$ is calculated for each text S. $p_i$ plays the same role as the importance (of equation (1)) in the first embodiment. Further, k is a word number assigned to each word in the reference text (the set of extracted texts S).

Figure 15:
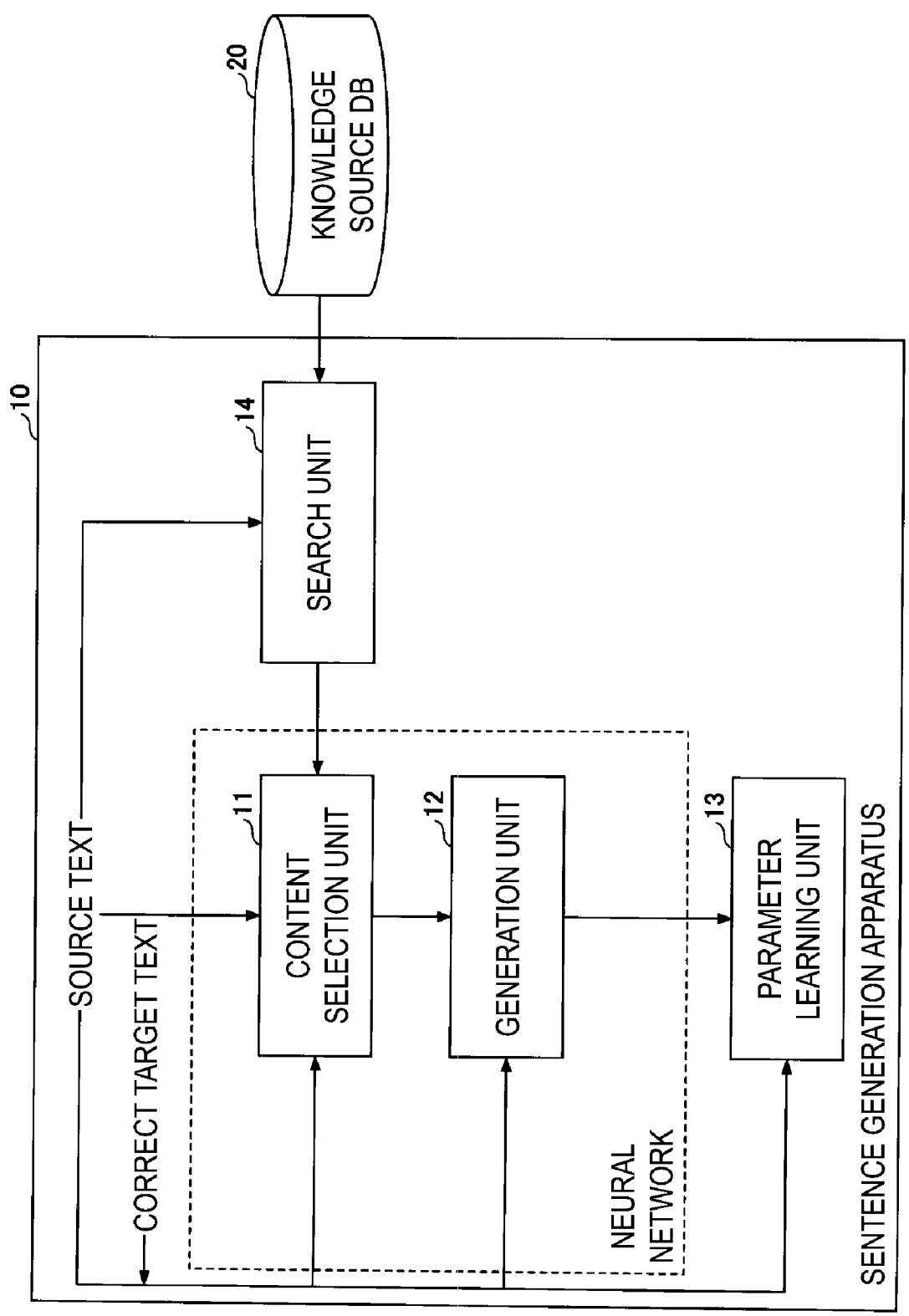
FIG. 15 is a diagram illustrating an exemplary functional configuration of a text generation apparatus 10 for training according to a third embodiment.

Next, training will be described. FIG. 15 is a diagram illustrating an exemplary functional configuration of the text generation apparatus 10 for training according to the third embodiment. In FIG. 15, the same or corresponding parts as those in FIG. 7 or 10 are denoted by the same reference signs and description thereof will be omitted as appropriate.

In the third embodiment, training of the content selection unit 11 and the generation unit 12 may be basically the same as in each of the above embodiments. Here, two methods for training the relevance measure calculation model used in the third embodiment will be described.

The first is a method of defining correct information of a text-level relevance measure 13 from a calculation result of the relevance measure 13 and a correct target text by using a score such as a Rouge score.

The second is a method of determining correct information of a word-level relevance measure as 1 or 0 indicating whether or not a correct text (for example, a target text such as a summary) includes a corresponding word.

Although an example in which the text generation apparatus 10 includes the search unit 14 has been shown above, all knowledge source texts included in external knowledge included in the knowledge source database 20 may be input to the content selection unit 11 when the external knowledge has been narrowed down in advance. In this case, the text generation apparatus 10 does not have to include the search unit 14.

According to the third embodiment, a summary including words that are not in a source text can be efficiently generated using external knowledge as described above. The words are those included in knowledge source texts which are each text as the name indicates. Thus, according to the third embodiment, information to be considered when generating a text can be added as text.

In a technology disclosed in "Ziqiang Cao, Wenjie Li, Sujian Li, and FuruWei. 2018. Retrieve, rerank and rewrite: Soft template based neural summarization. In Proceedings of the 56th Annual Meeting of the Association for Computational Linguistics (Volume 1: Long Papers), pages 152-161. Association for Computational Linguistics," (1) words included in external knowledge cannot be used for text generation as they are, although a target text can be generated taking into consideration external knowledge. In addition, in this technology, (2) the importance of each content of external knowledge cannot be taken into consideration.

On the other hand, in the third embodiment, (1) text-level and word-level relevance measures of external knowledge can be taken into consideration and (2) important parts in external knowledge can be included in an output text using CopyNetwork (the synthesis unit 124).

Next, a fourth embodiment will be described. The fourth embodiment will be described with respect to points different from the first embodiment. Points not particularly mentioned in the fourth embodiment may be the same as those in the first embodiment.

Figure 16:
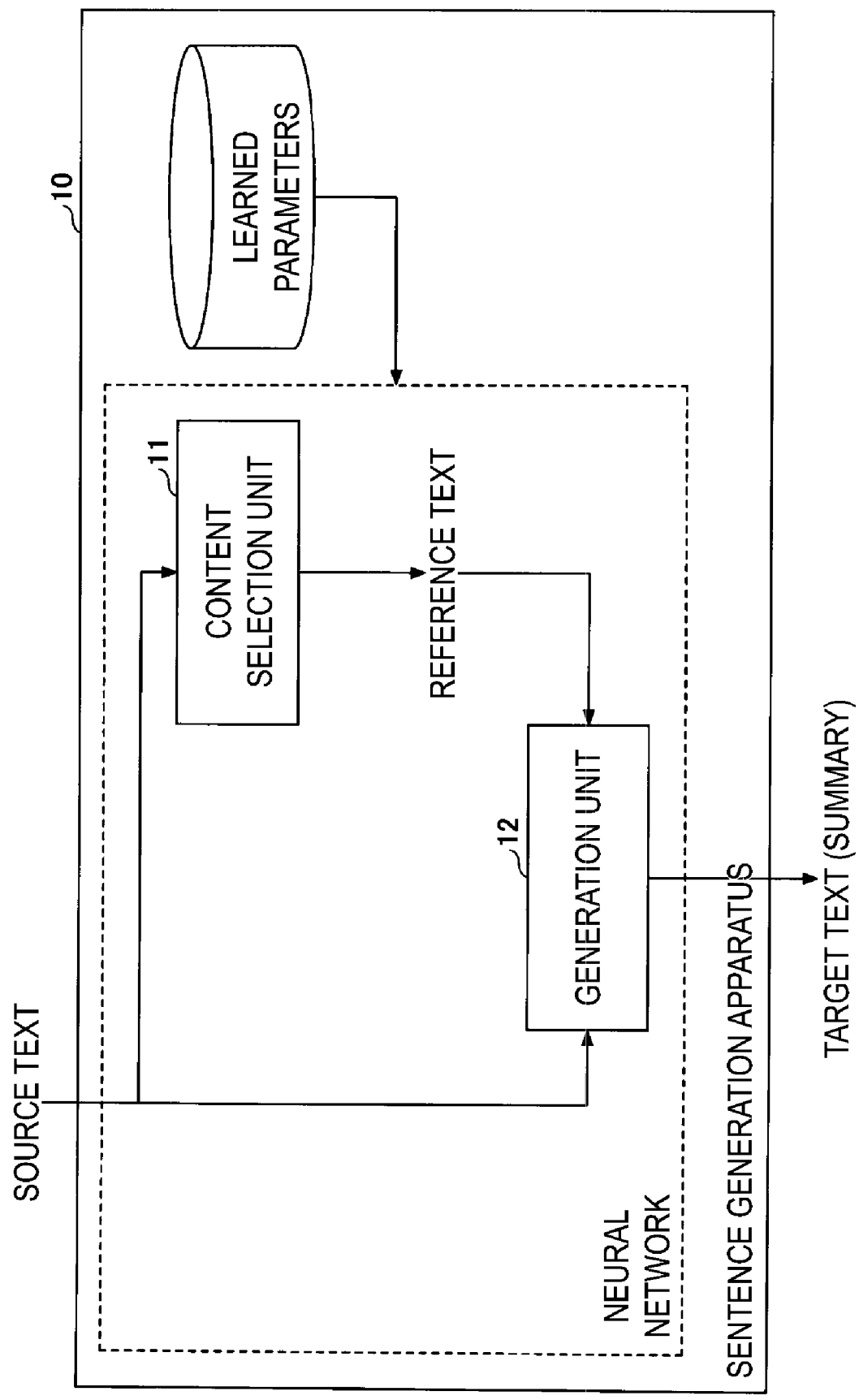
FIG. 16 is a diagram illustrating an exemplary functional configuration of a text generation apparatus 10 according to a fourth embodiment.

FIG. 16 is a diagram illustrating an exemplary functional configuration of a text generation apparatus 10 according to the fourth embodiment. In FIG. 16, the same or corresponding parts as those in FIG. 2 are denoted by the same reference signs. In the fourth embodiment, consideration information is not input to a content selection unit 11 as illustrated in FIG. 16.

The content selection unit 11 includes M layers of Transformer encoder blocks (Encoder$_{sal}$) and 1 linear transformation layers. The content selection unit 11 calculates an importance $p^{ext}_n$ of an n-th word $x^C_n$ in a source text $X^C$ based on the following equation.

$$p^{ext}_n = \sigma(W_1^T \text{Encoder}_{sal}(X^C)_n + b_1) \qquad [\text{Math. 27}]$$

Where Encoder$_{sal}$( ) represents an output vector of a final layer of Encoder$_{sal}$. $W_1$, $b_1$, and $\sigma$ are as described with respect to Math. 1.

The content selection unit 11 extracts K words from a source text $X^C$ as a reference text $X^P$ in descending order of the importance $p^{ext}_n$ obtained by inputting the source text $X^C$ to the Encoder$_{sal}$. Here, the order of words in the reference text $X^P$ maintains the order in the source text $X^C$. The content selection unit 11 inputs the reference text $X^P$ to a generation unit 12. That is, in the fourth embodiment, a word sequence that the content selection unit 11 has extracted based on a predicted value of the importance of each word is explicitly given to the generation unit 12 as additional text information.

Figure 17:
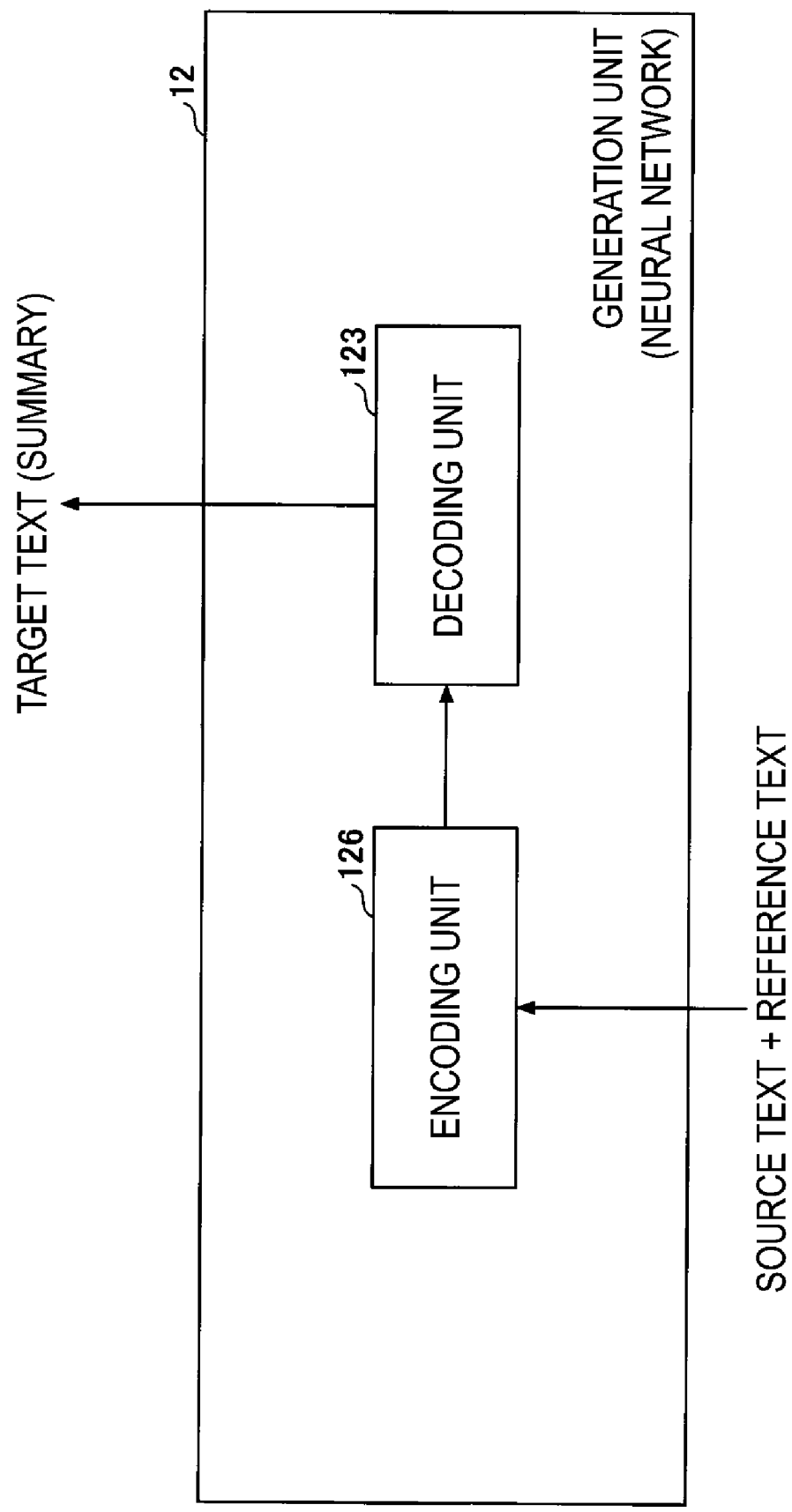
FIG. 17 is a diagram illustrating an exemplary configuration of a generation unit 12 according to the fourth embodiment.

FIG. 17 is a diagram illustrating an exemplary configuration of the generation unit 12 according to the fourth embodiment. In FIG. 17, the same or corresponding parts as those in FIG. 3 are denoted by the same reference signs. In FIG. 17, the generation unit 12 includes an encoding unit 126 and a decoding unit 123. The encoding unit 126 and the decoding unit 123 will be described in detail with reference to FIG. 18.

Figure 18:
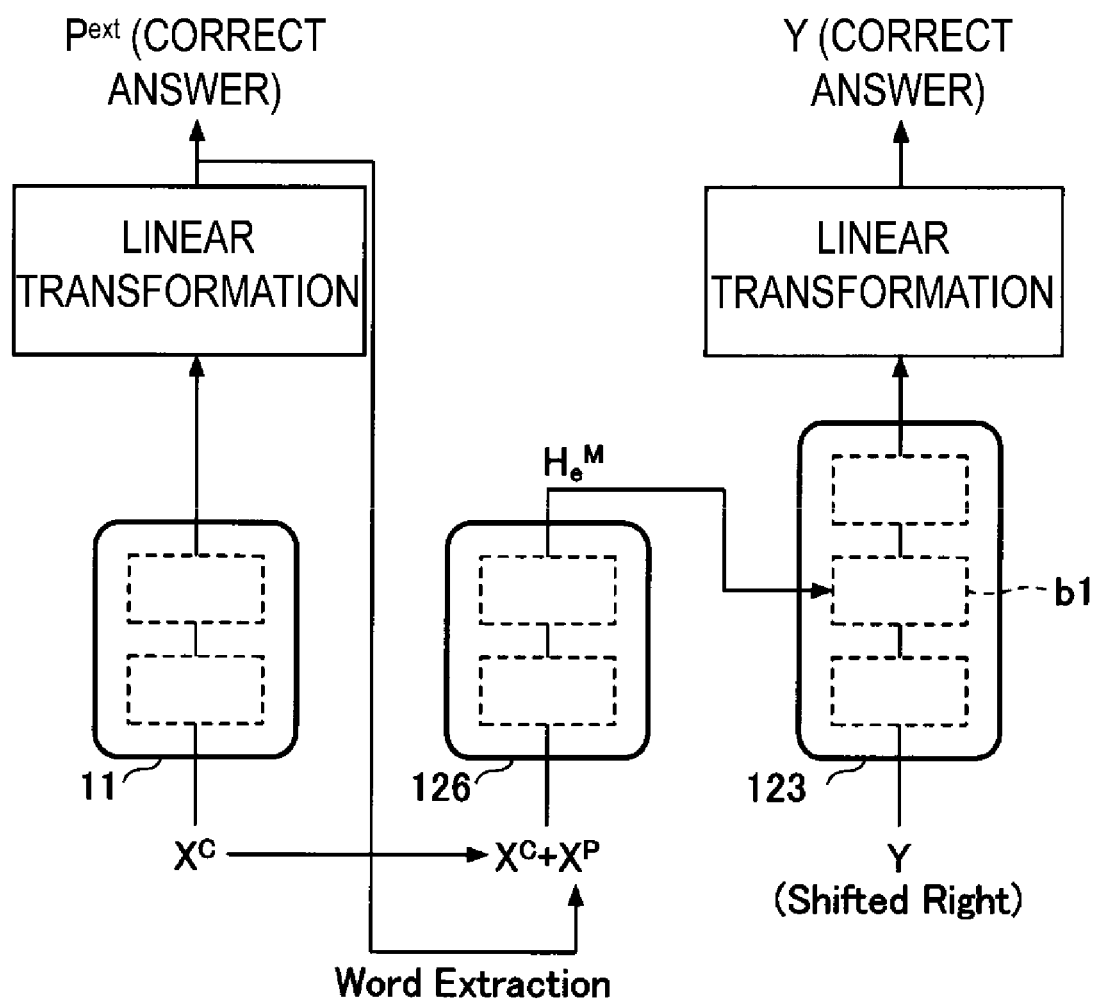
FIG. 18 is a diagram illustrating an exemplary model configuration according to the fourth embodiment.

FIG. 18 is a diagram illustrating an exemplary model configuration according to the fourth embodiment. In FIG. 18, the same or corresponding parts as those in FIG. 16 or 17 are denoted by the same reference signs. The model illustrated in FIG. 18 is referred to as a Conditional summarization model with Important Tokens (CIT) model for convenience.

The encoding unit 126 includes M layers of Transformer encoder blocks. The encoding unit 126 receives $X^C + X^P$ as an input. $X^C + X^P$ is a character sequence with a special token representing a delimiter inserted between $X^C$ and X. $X^C + X^P$ is a string of characters into which a special token representing a delimiter is inserted between $X^C$ and $X^P$. In the present embodiment, RoBERTa ("Y. Liu et al. arXiv, 1907.11692, 2019.") is used as an initial value for Encoder$_{sal}$. The encoding unit 126 receives the input $X^C + X^P$ and obtains a representation $$H^M_e = \{h^M_{e1}, h^M_{e2}, \ldots h^M_{eN}\} \in \mathbb{R}^{N \times d} \qquad [\text{Math. 28}]$$

as a processing result of the M layers of blocks. Here, N is the number of words included in $X^C$. However, in the fourth embodiment, N+K is substituted for N, where K is the number of words included in X. Here, the encoding unit 126 includes a self-attention and a two-layer feedforward network (FFN). $H^M_e$ is input to a context-attention of the decoding unit 123 which will be described later.

The decoding unit 123 may be the same as that of the first embodiment. That is, the decoding unit 123 includes M layers of Transformer decoder blocks. The decoding unit 123 receives the output $H^M_e$ of the encoder and a sequence $\{y_1, \ldots y_{t-1}\}$ up to one step before output by the model as inputs and obtains a representation $$H_d^M = \{h_{d1}^M, \ldots h_{dt}^M\} \in \mathbb{R}^{t \times d} \qquad \text{[Math. 29]}$$

as a processing result of the M layers of blocks. In each step t, the decoding unit 123 linearly transforms $h^M_{dt}$ into the dimensionality of vocabulary size V and outputs $y_t$ which maximizes the probability as a next token. The decoding unit 123 includes a self-attention (a block $b_1$ in FIG. 18), a context-attention, and a two-layer FFN.

All attention processing in the multi-head attention Transformer blocks uses multi-head attention ("A. Vaswani et al. In NIPS, pages 5998-6008, 2017"). This processing involves a combination of k attention heads and is expressed as Multihead(Q, K, V)=Concat(head1, . . . , headk)$W^o$. Each head is head$_i$=Attention($QW^Q_i$, $Kw^K_i$, $VW^V_i$). Here, in the self-attention of an m-th layer of each of the encoding unit 126 and the decoding unit 123, the same vector representation $H^m$ is given to Q, K, and V, and in the content-attention of the decoding unit 123, Q is given to $H^m_d$ and $H^M_e$ is given to K and V.

A weight matrix A in the attention of each head $$\text{Attention}(\tilde{Q}, \tilde{K}, \tilde{V}) = A\tilde{V} \qquad \text{[Math. 30]}$$

is expressed by the following equation:

[Math. 31]

$$A = \text{softmax}\left(\frac{\tilde{Q}\tilde{K}^T}{\sqrt{d_k}}\right) \in \mathbb{R}^{I \times J}$$

where $$d_k = d/k, \tilde{Q} \in \mathbb{R}^{I \times d}, \tilde{K}, \tilde{V} \in \mathbb{R}^{J \times d} \qquad \text{[Math. 32]}$$

Figure 19:
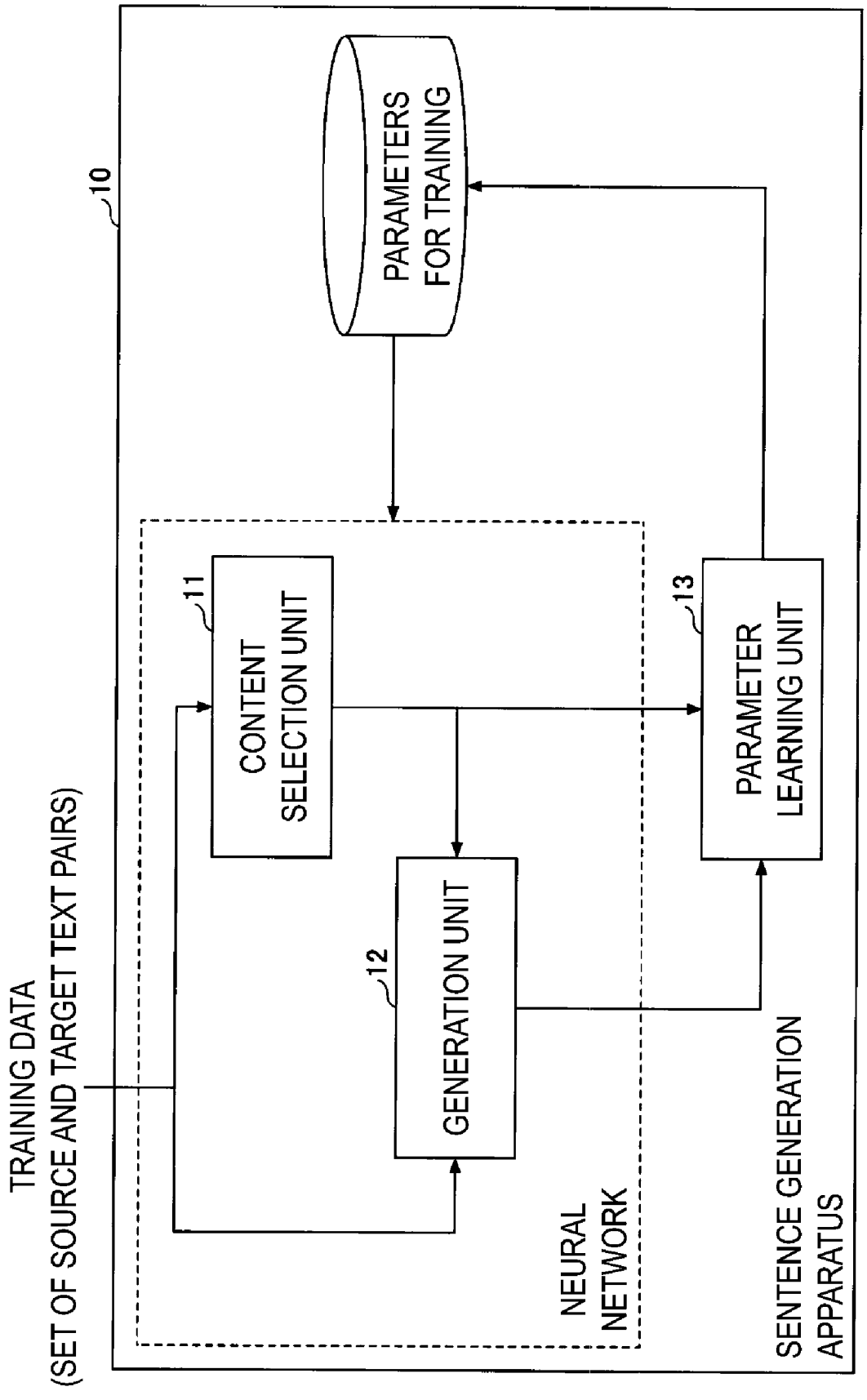
FIG. 19 is a diagram illustrating an exemplary functional configuration of a text generation apparatus 10 for training according to the fourth embodiment.

Next, training will be described. FIG. 19 is a diagram illustrating an exemplary functional configuration of a text generation apparatus 10 for training according to the fourth embodiment. In FIG. 19, the same parts as those in FIG. 7 are denoted by the same reference signs and description thereof will be omitted.

Training Data and Loss Function of Generation Unit 12

Training data of the generation unit 12 may be the same as that of the first embodiment. A loss function of the generation unit 12 is defined as follows using cross entropy. M represents the number of training data examples.

[Math. 33]

$$L_{encdec} = -\frac{1}{MT}\sum_{m=1}^{M}\sum_{t=1}^{T}\log p(y_t^m)$$

Training Data and Loss Function of Content Selection Unit 11

Supervised learning becomes possible by giving pseudo-correct answers because the content selection unit 11 outputs a prediction $p^{ext}_n$ for each word position n of the source text. Generally, correct answers of summaries are only pairs of a source text and a summary, such that a correct answer of 1 or 0 is not given for each token of the source text. However, assuming that words included in both a source text and a summary are important words, pseudo-correct answers of important tokens can be created by aligning token sequences of both the source text and the summary ("S. Gehrmann et al. In EMNLP, pages 4098-4109, 2018").

A loss function of the content selection unit 11 is defined as follows using binary cross entropy.

[Math. 34]

$$N_{sal} = -\frac{1}{MN}\sum_{m=1}^{M}\sum_{n=1}^{N}\left\{\begin{array}{l}r_n^m \log P_n^{ext(m)} + \\ (1 - r_n^m)\log(1 - P_n^{ext(m)})\end{array}\right\}$$

where $r^m_n$ represents a correct answer of the importance of an n-th word of the source text in an m-th data example.

Parameter Learning Unit 13

In the fourth embodiment, the parameter learning unit 13 trains the content selection unit 11 using training data of the importance and trains the generation unit 12 using correct answer information of the summary Y. That is, training of the content selection unit 11 and training of the generation unit 12 are performed independently.

The parameter learning unit 13 performs training with the loss function $L_{gen} = L_{encdec} + L_{sal}$ such that $L_{gen}$ is minimized.

In the first embodiment, "the importance of each word according to the output length" is learned by making the length of the target text (summary) in the training data equal to the output length which is consideration information. On the other hand, in the fourth embodiment, the training data does not include the output length which is consideration information. Thus, the output length is not particularly taken into consideration in the calculation of the importance of the word in the content selection unit 11 and the importance is calculated only from the viewpoint of "whether or not the word is important for summarization."

However, also in the fourth embodiment, the summary length can be controlled by taking the output length as consideration information as an input and determining the number of tokens to be extracted based on the output length.

Next, a fifth embodiment will be described. The fifth embodiment will be described with respect to points different from the fourth embodiment. Points not particularly mentioned in the fourth embodiment may be the same as those in the fourth embodiment.

Figure 20:
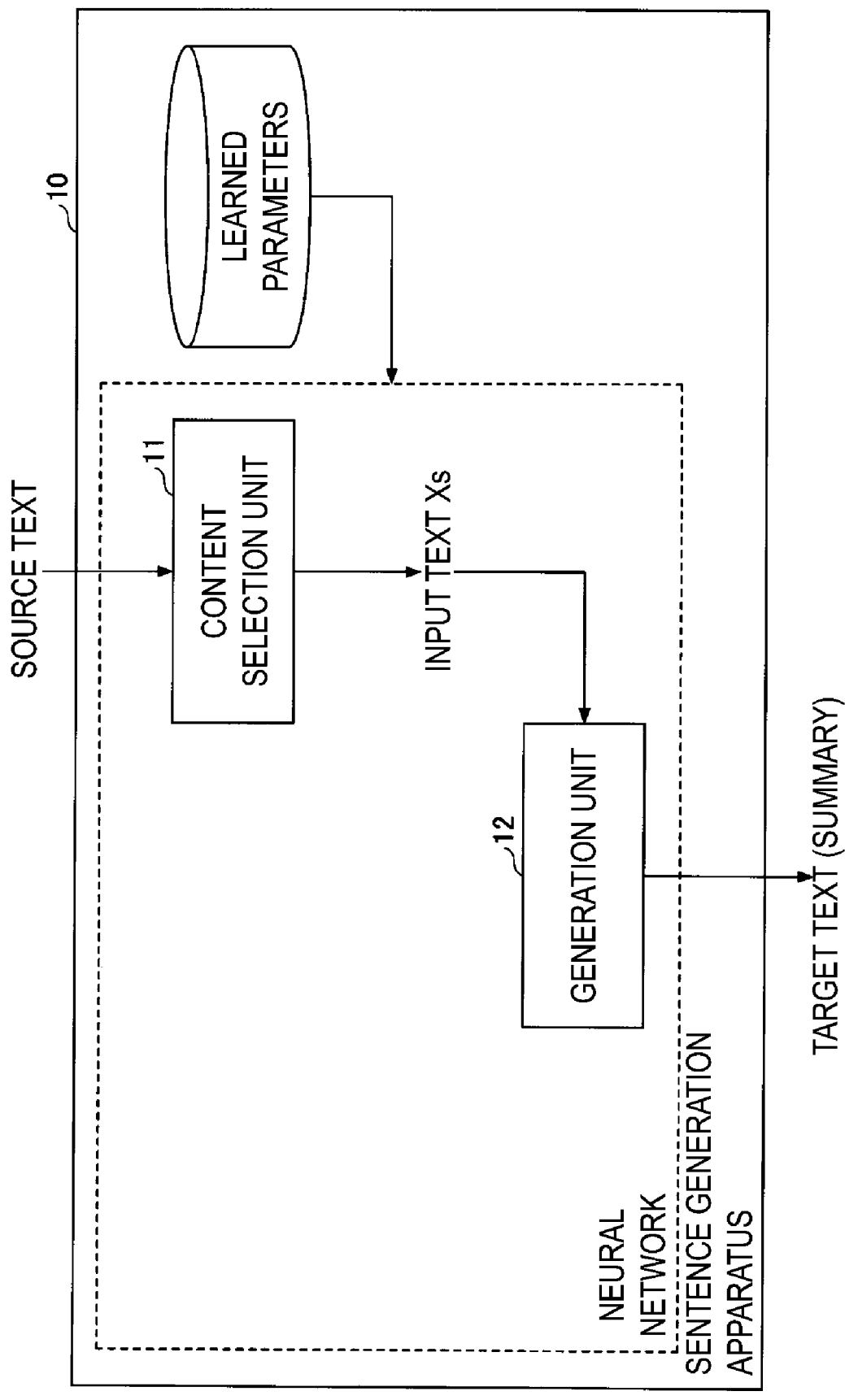
FIG. 20 is a diagram illustrating an exemplary functional configuration of a text generation apparatus 10 according to a fifth embodiment.

FIG. 20 is a diagram illustrating an exemplary functional configuration of a text generation apparatus 10 according to the fifth embodiment. In FIG. 20, the same parts as those in FIG. 16 are denoted by the same reference signs.

A content selection unit 11 in the fifth embodiment calculates a text-level importance $p^{ext}_{Sj}$ using a word-level importance $p^{ext}_n$ obtained from the separately trained Encoder$_{sal}$ and outputs a combination of top P texts in terms of $p^{ext}_{Sj}$ in the source text $X^C$ to a generation unit 12 as an input text $X_s$. The text-level importance $p^{ext}_{Sj}$ can be calculated based on Math. 3.

Figure 21:
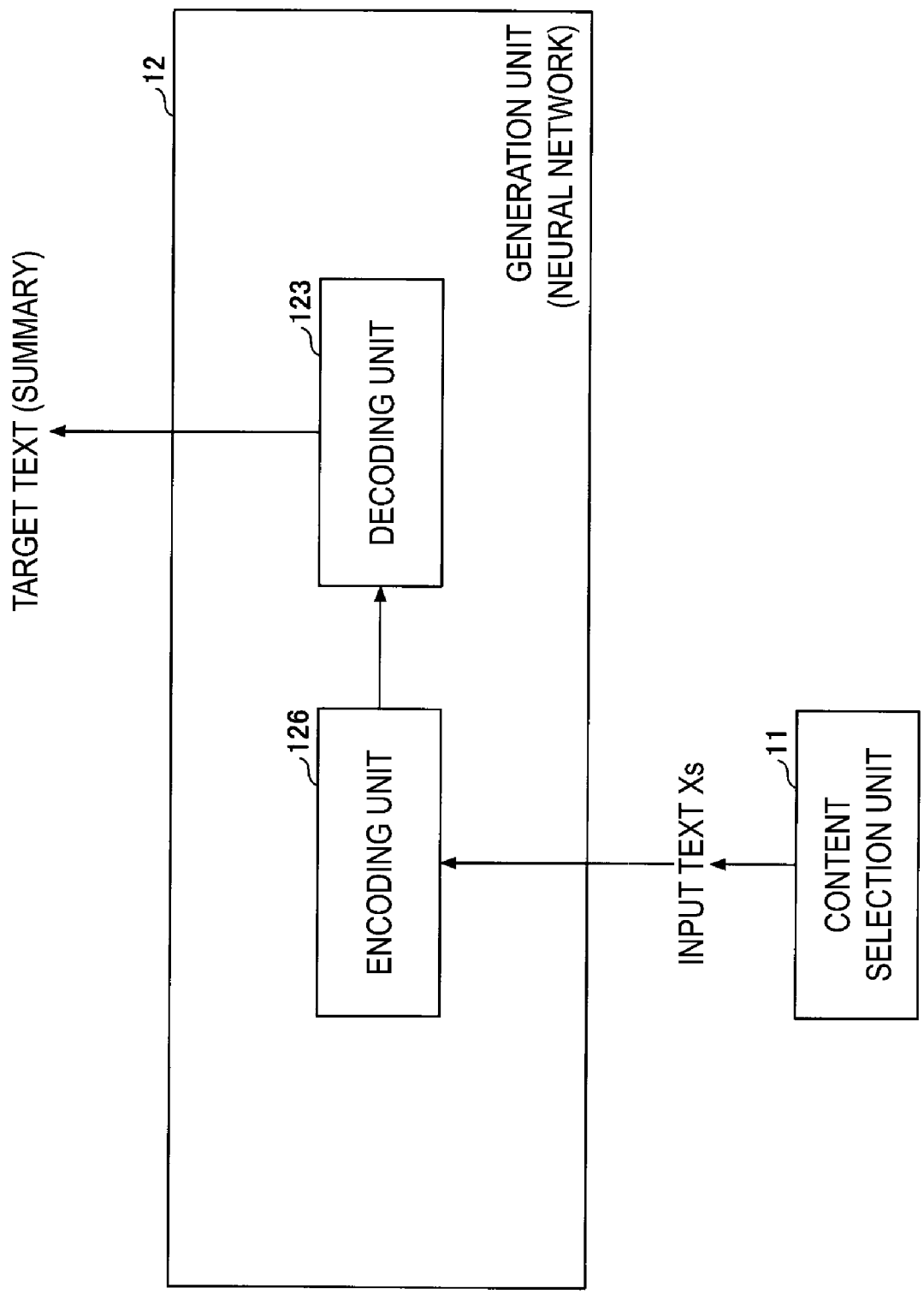
FIG. 21 is a diagram illustrating an exemplary configuration of a generation unit 12 according to the fifth embodiment.
Figure 22:
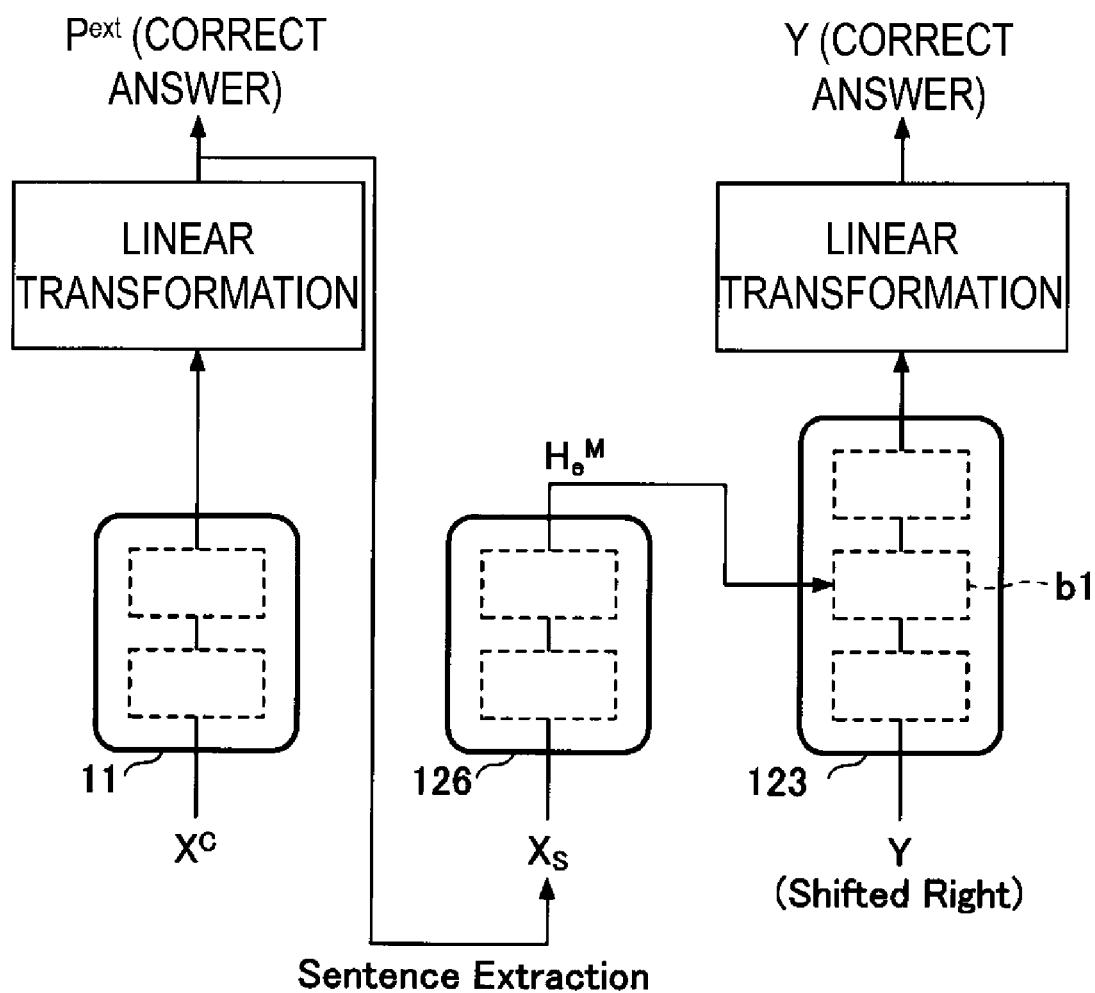
FIG. 22 is a diagram illustrating an exemplary model configuration according to the fifth embodiment.

FIG. 21 is a diagram illustrating an exemplary configuration of the generation unit 12 according to the fifth embodiment. In FIG. 21, the same parts as those in FIG. 17 are denoted by the same reference signs. FIG. 22 is a diagram illustrating an exemplary model configuration according to the fifth embodiment. In FIG. 22, the same parts as those in FIG. 18 are denoted by the same reference signs.

An encoding unit 126 in the fifth embodiment receives the input text $X_s$ as an input as illustrated in FIGS. 21 and 22. The model illustrated in FIG. 22 is referred to as a Text Extraction then Generation (SEG) model for convenience.

Other points are the same as those in the fourth embodiment.

Next, a sixth embodiment will be described. The sixth embodiment will be described with respect to points different from the fourth embodiment. Points not particularly mentioned in the fourth embodiment may be the same as those in the fourth embodiment.

Figure 23:
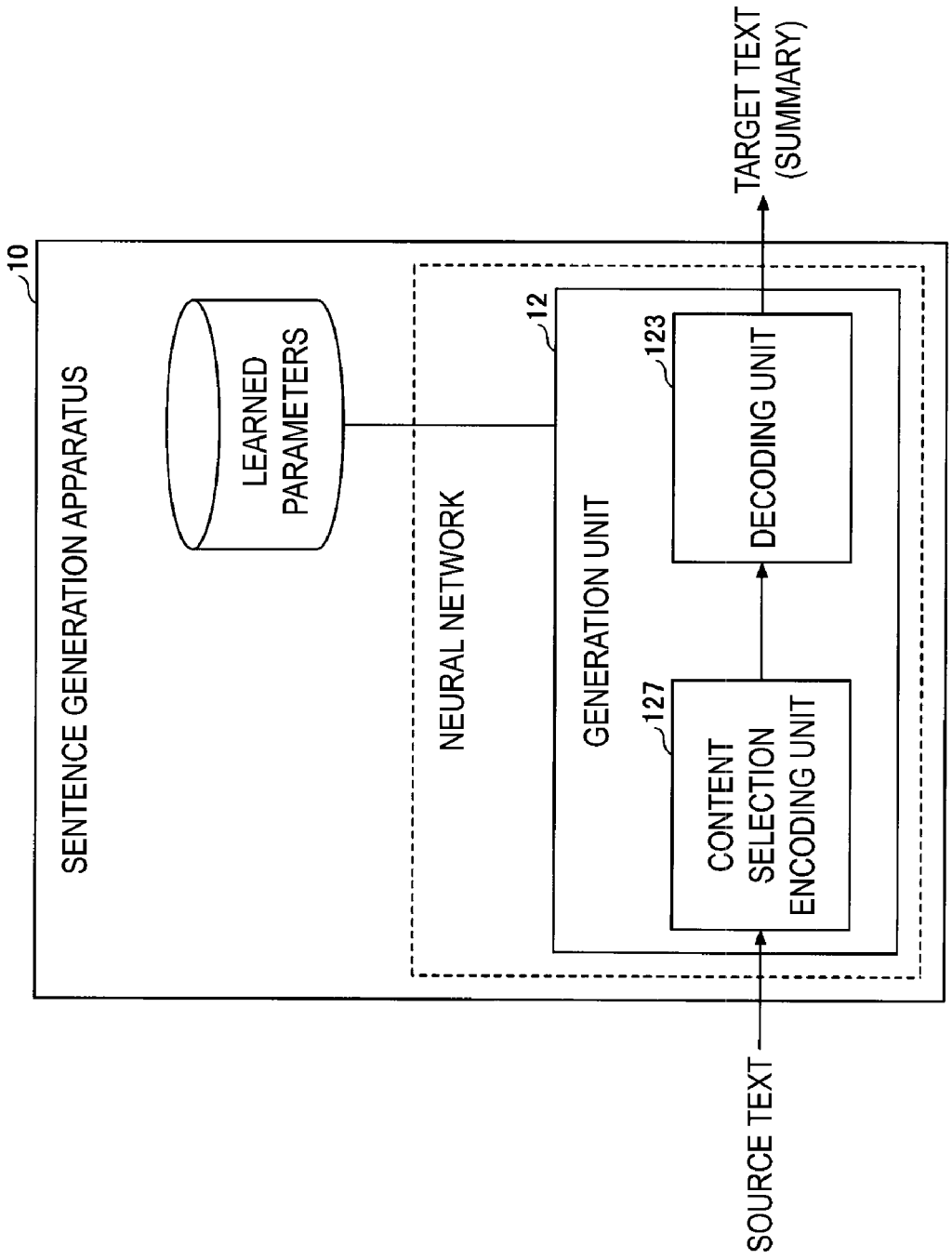
FIG. 23 is a diagram illustrating an exemplary functional configuration of a text generation apparatus 10 according to a sixth embodiment.

FIG. 23 is a diagram illustrating an exemplary functional configuration of a text generation apparatus 10 according to the sixth embodiment. In FIG. 23, the same or corresponding parts as those in FIG. 16 or 17 are denoted by the same reference signs. In the sixth embodiment, the text generation apparatus 10 does not include the content selection unit 11. On the other hand, the generation unit 12 includes a content selection encoding unit 127 instead of the encoding unit 126. The content selection encoding unit 127 has the functions of both the encoding unit 126 (encoder) and the content selection unit 11. That is, an encoding unit 126 that also serves as the content selection unit 11 corresponds to the content selection encoding unit 127.

Figure 24:
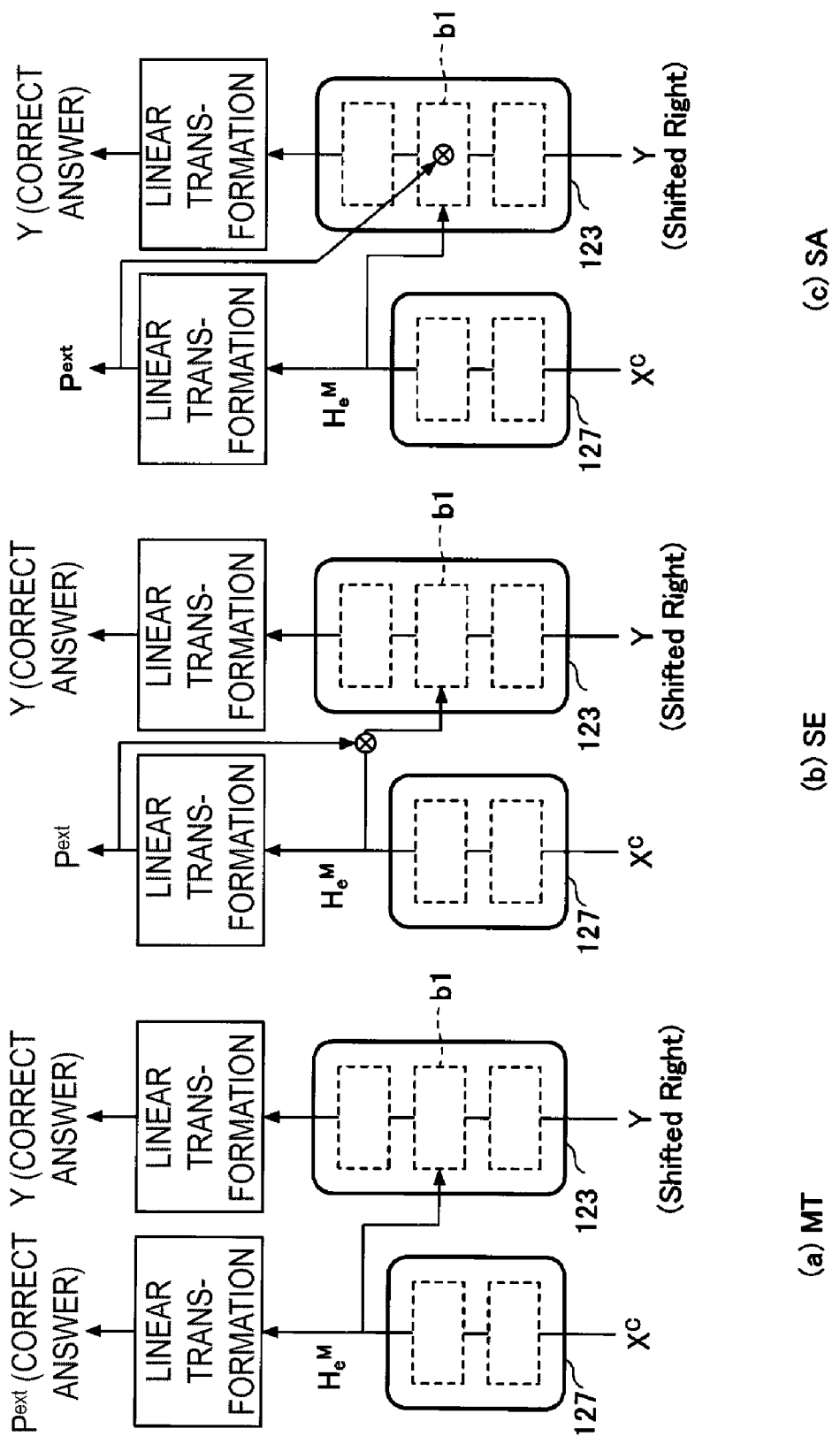
FIG. 24 is a diagram illustrating an exemplary model configuration according to the sixth embodiment.

FIG. 24 is a diagram illustrating an exemplary model configuration according to the sixth embodiment. In FIG. 24, the same or corresponding parts as those in FIG. 23 or 18 are denoted by the same reference signs. FIG. 24 illustrates examples of three models (a) to (c). For convenience, an multi-task (MT) model is denoted by (a), a selective encoding (SE) model is denoted by (b), and a selective attention (SA) model is denoted by (c).

The MT model (a) additionally uses correct answer data on the importance $p^{ext}_n$ and trains the content selection encoding unit 127 and the decoding unit 123 (that is, the generation unit 12) at the same time. That is, an importance model and a text generation model are trained at the same time. This point is common to the SE and SA models and models which will be described below (that is, those other than the CIT and SEG models). In the MT model, the Encoder$_{sal}$ of the content selection encoding unit 127 shares parameters of the encoding unit 126 of the fourth embodiment. In the MT model, only the encoding result ($H^M_e$) is input to the decoding unit 123 as is apparent from FIG. 24.

The decoding unit 123 may be the same as that of the fourth embodiment.

The SE model (b) biases the encoding result of the content selection encoding unit 127 using the importance $p^{ext}_n$ ("Q. Zhou et al. In ACL, pages 1095-1104, 2017"). Specifically, the decoding unit 123 weights the encoding result $h^M_{en}$, which is a final output of the encoder blocks of the content selection encoding unit 127, by the importance as follows.

$$h_{en}^M = h_{en}^M p_n^{ext} \qquad \text{[Math. 35]}$$

In the SE model (b), $h^M_{en}$ input to the decoding unit 123 is replaced with $\tilde{h}^M_{en}$ (where h~ indicates a symbol h with ~above it). While BiGRU is used in "Q. Zhou et al. In ACL, pages 1095-1104, 2017," the decoding unit 123 is implemented using a Transformer for fair comparison in the present embodiment. In the SE model, the Encoder$_{sal}$ of the content selection encoding unit 127 shares parameters of the encoding unit 126 of the fourth embodiment. In the SE model, only the encoding result ($H^M_e$) and the importance $P^{ext}_n$ are input to the decoding unit 123 as is apparent from FIG. 24. In the SE model, the correct answer of the importance is not given.

Unlike the SE model, the SA model (c) weights the attention on the decoding unit 123 side. Specifically, the decoding unit 123 weights an attention probability of each step t (a t-th row of $A_i$) of a weight matrix of an i-th head of the context-attention by $p^{ext}_n$ as shown in Math. 38, where the weight matrix is represented by $$A_i \in \mathbb{R}^{T \times N} \qquad \text{[Math. 36]}$$

and the attention probability of each step t is represented by

[Math. 37]

$$a_i^t \in \mathbb{R}^N.$$

[Math. 38]

$$\tilde{a}_{in}^t = \frac{a_{in}^t p_n^{ext}}{\sum_n a_{in}^t p_n^{ext}}$$

The copy probability of the pointer generator is weighted using a similar method proposed by Gehrmann et al. ("S. Gehrmann et al. In EMNLP, pages 4098-4109, 2018"). On the other hand, in the present embodiment, calculation using the weighted attention probability is performed in the context-attention calculation of all layers of the decoding unit 123 because the pre-trained seq-to-seq model does not have a copy mechanism. In the MT model, the Encoder$_{sal}$ of the content selection encoding unit 127 shares parameters of the encoding unit 126 of the fourth embodiment. In the SA model, only the encoding result ($H^M_e$) and the importance $P^{ext}_n$ are input to the decoding unit 123 as is apparent from FIG. 24. In the SA model, the correct answer of importance is not given.

A model that combines the MT model and the SE model or the MT model is also effective in the sixth embodiment.

The SE+MT model additionally uses correct answer data on the importance $p^{ext}_n$ in training of the SE model, such that simultaneous training with summarization is performed.

The SA+MT model additionally uses correct answer data on the importance $p^{ext}_n$ in training of the SA model, such that simultaneous training with summarization is performed.

Figure 25:
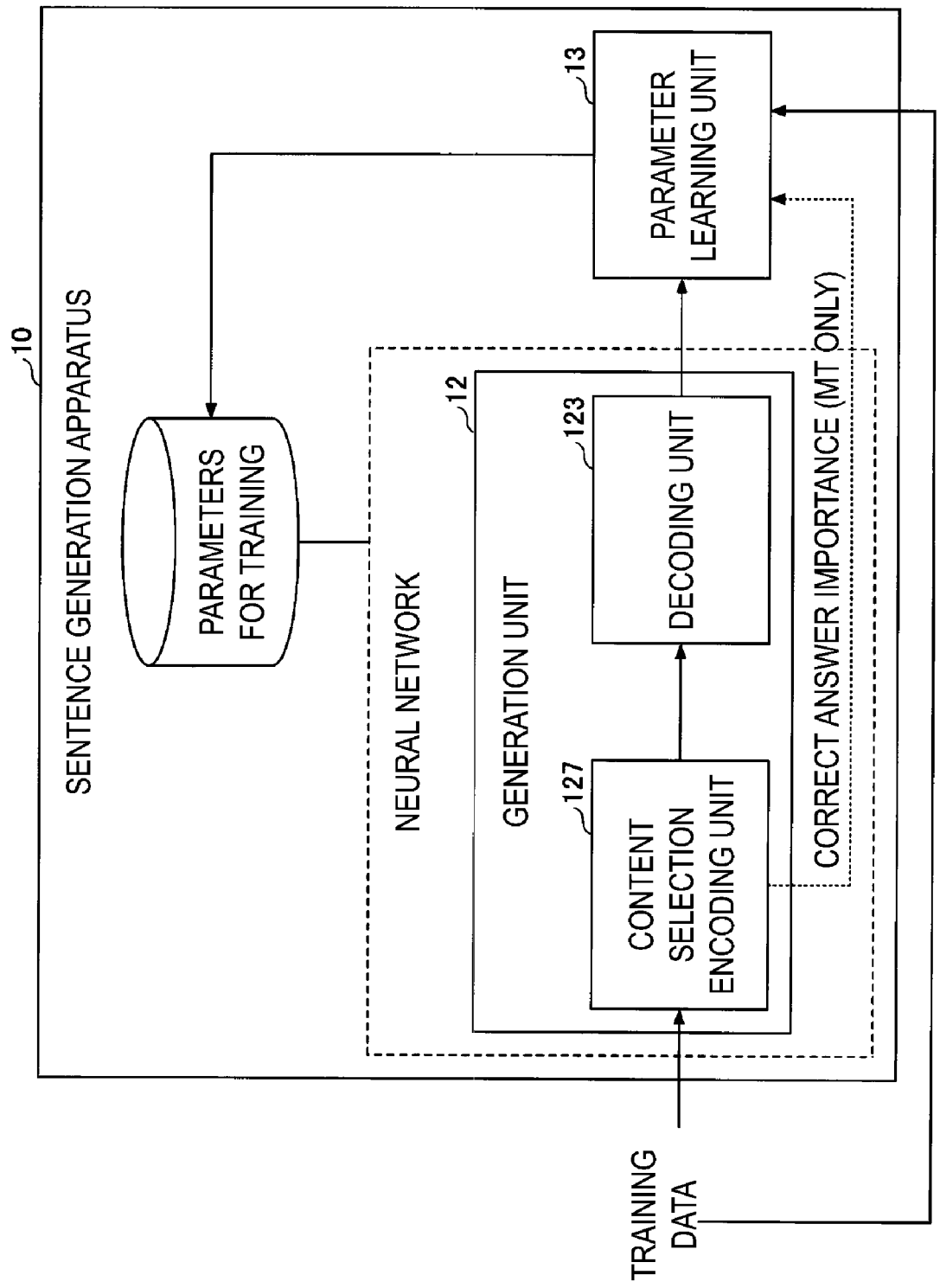
FIG. 25 is a diagram illustrating an exemplary functional configuration of a text generation apparatus 10 for training according to the sixth embodiment.

FIG. 25 is a diagram illustrating an exemplary functional configuration of a text generation apparatus 10 for training according to the sixth embodiment. In FIG. 25, the same or corresponding parts as those in FIG. 23 or 19 are denoted by the same reference signs.

The parameter learning unit 13 of the sixth embodiment trains the content selection encoding unit 127 and the decoding unit 123 at the same time as described above.

In the case of the SE and SA models, the parameter learning unit 13 does not give correct answer information of the importance $P^{ext}_n$ and trains the generation unit 12 (the content selection encoding unit 127 and the decoding unit 123) using only correct answer information of the summary Y. In this case, the parameter learning unit 13 performs training with the loss function $L_{gen}=L_{encdec}$ such that $L_{gen}$ is minimized.

On the other hand, in the case of the MT model, the parameter learning unit 13 performs multi-task training of the content selection encoding unit 127 and the generation unit 12 (that is, the content selection encoding unit 127 and the decoding unit 123) using correct answer information of the importance S and correct answer information of the summary Y. That is, when training the content selection encoding unit 127 as an importance model (the content selection unit 11), the parameter learning unit 13 learns a task of predicting the importance $P^{ext}_n$ from $X^C$ using the correct answer information (indicating whether or not the word is important) of the importance $P^{ext}_n$ as teacher data. On the other hand, when training the generation unit 12 (content selection encoding unit 127+decoding unit 123) as a Seq2Seq (encoder-decoder) model, the parameter learning unit 13 learns a task of predicting a summary Y from an input text $X^C$ using a correct answer summary for $X^C$ as teacher data. During this multi-task training, parameters of the content selection encoding unit 127 are shared by the two tasks. The correct answer information (pseudo-correct answer) of the importance $P^{ext}_{is}$ as described in the fourth embodiment. In this case, the parameter learning unit 13 performs training with the loss function $L_{gen}=L_{encdec}+L_{sal}$ such that $L_{gen}$ is minimized.

Next, a seventh embodiment will be described. The seventh embodiment will be described with respect to points different from the fourth embodiment. Points not particularly mentioned in the fourth embodiment may be the same as those in the fourth embodiment.

Figure 26:
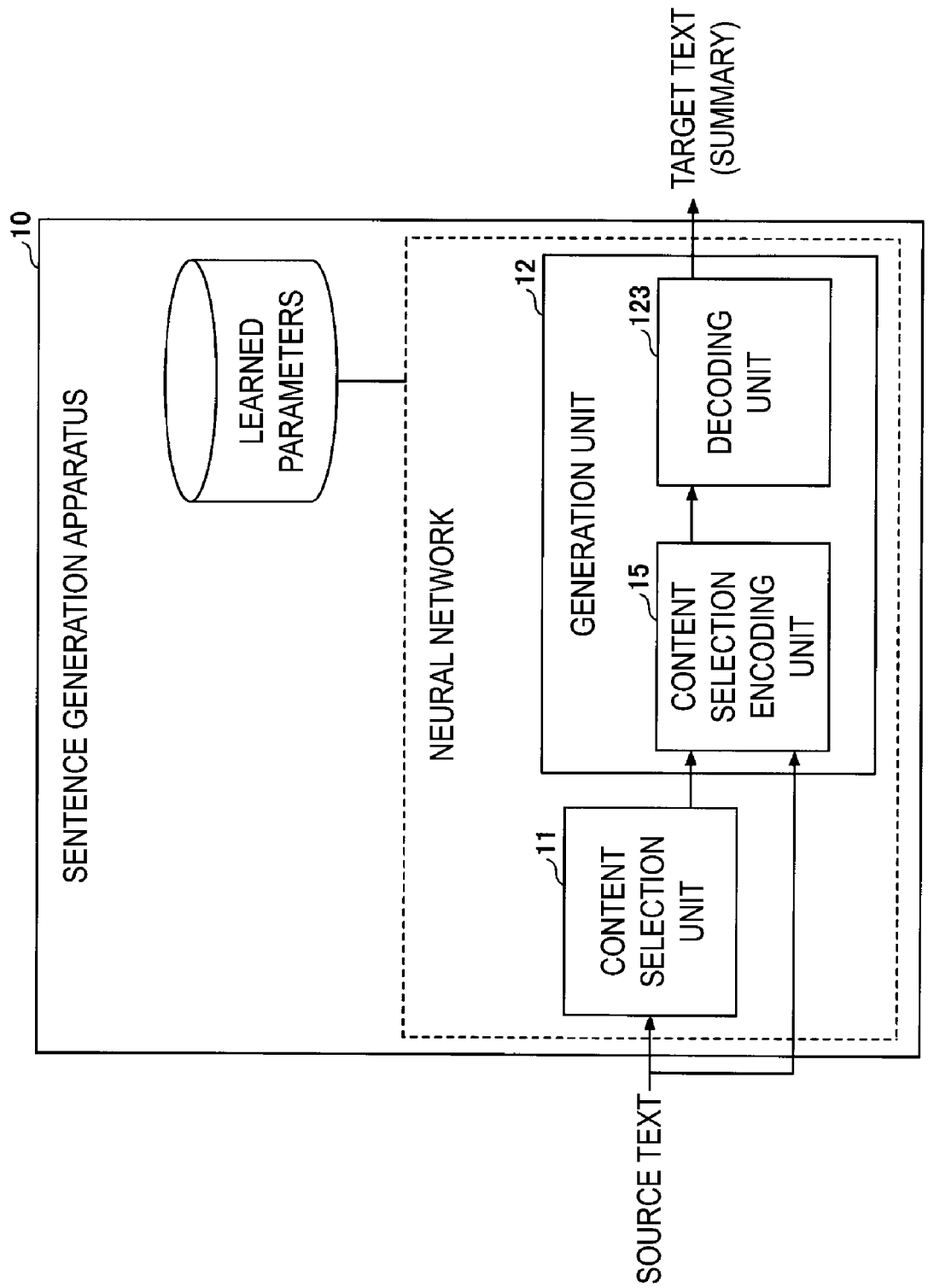
FIG. 26 is a diagram illustrating an exemplary functional configuration of a text generation apparatus 10 according to a seventh embodiment.

FIG. 26 is a diagram illustrating an exemplary functional configuration of a text generation apparatus 10 according to the seventh embodiment. In FIG. 26, the same or corresponding parts as those in FIG. 16 or 23 are denoted by the same reference signs. The text generation apparatus 10 of FIG. 26 includes a content selection unit 11 and a generation unit 12. The generation unit 12 includes a content selection encoding unit 127 and a decoding unit 123. That is, the text generation apparatus 10 of the seventh embodiment includes both the content selection unit 11 and the content selection encoding unit 127.

Such a configuration can be implemented by combining the CIT model (or the SEG model) described above with the SE or SA model (or the MT model). Hereinafter, a combination of the CIT model and the SE model (CIT+SE model) and a combination of the CIT model and the SA model (CIT+SA model) will be described.

In the CIT+SE model, the importance of the SE model $$p^{ext} \in \mathbb{R}^{N+K}$$ [Math. 39]

is learned on the SE model unsupervised learning for $X^C+X^P$ of the CIT model, to weight $$H_e^M \in \mathbb{R}^{N+K}$$ [Math. 40]

That is, $X^C+X^P$ is input to the content selection encoding unit 127 of the SE model (where $X^C$ is selected by the content selection unit 11) and the importance $p^{ext}$ for $X^C+X^P$ is estimated.

Figure 27:
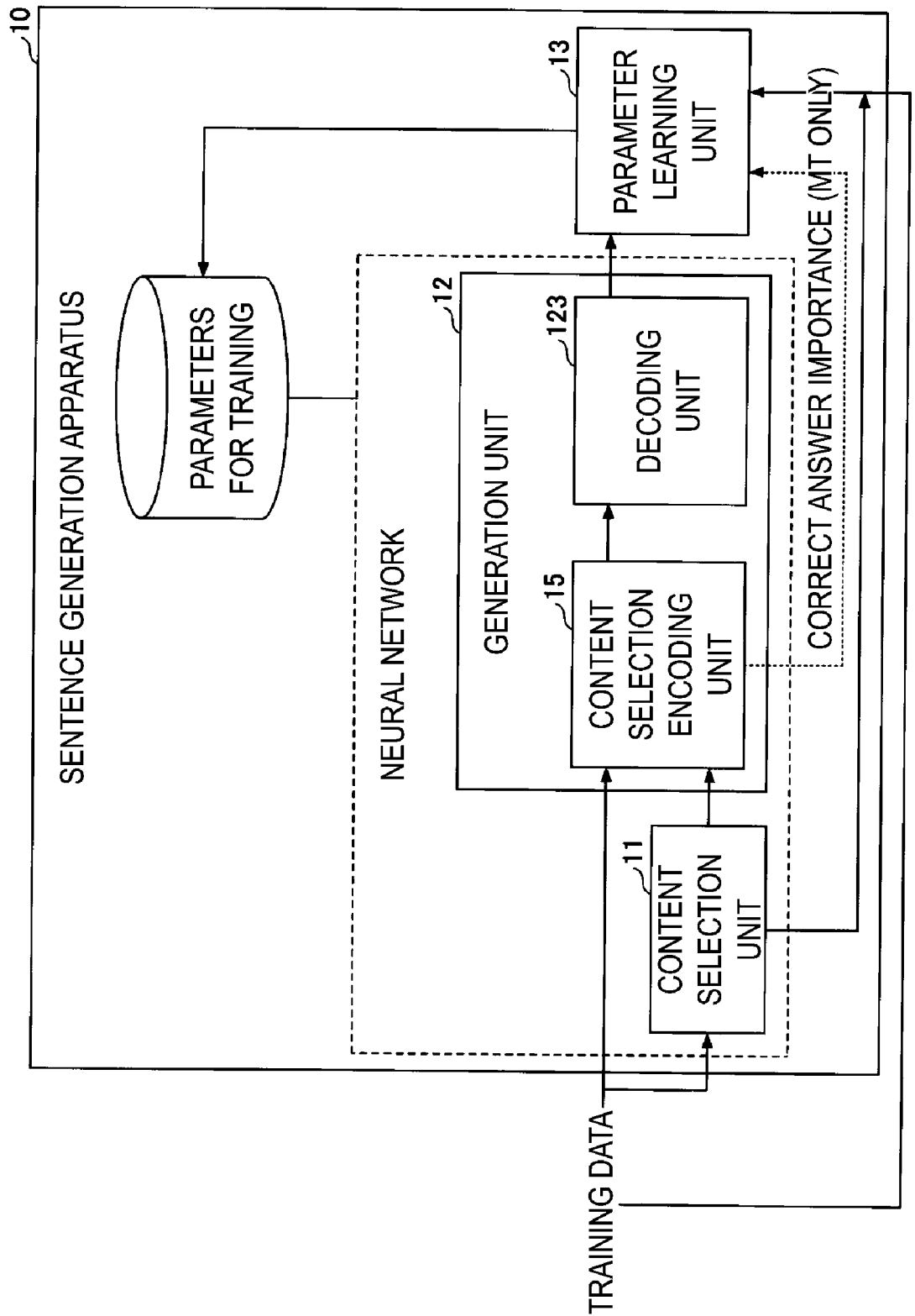
FIG. 27 is a diagram illustrating an exemplary functional configuration of a text generation apparatus 10 for training according to the seventh embodiment.

On the CIT+SA model, $$p^{ext} \in \mathbb{R}^{N \times K}$$ [Math. 41]

is learned by unsupervised learning, to weight $$a_i^t \in \mathbb{R}^{N \times K}$$ [Math. 42]

as in the CIT+SE model. That is, $X^C+X^P$ of the CIT model is input to the content selection encoding unit 127 of the SA model and the importance $p^{ext}$ for $X^C+X^P$ is estimated. FIG. 27 is a diagram illustrating an exemplary functional configuration of the text generation apparatus 10 for training according to the seventh embodiment. In FIG. 27, the same or corresponding parts as those in FIG. 26 or 19 are denoted by the same reference signs.

The process executed by the parameter learning unit 13 in the seventh embodiment may be the same as that in the sixth embodiment.

Experiment

Experiments performed for the fourth to seventh embodiments will be described.

Datasets

CNN/DM ("K. M. Hermann et al. In NIPS, pages 1693-1701, 2015.") and XSum ("S. Narayan et al. In EMNLP, pages 1797-1807, 2018.") which are representative summarization datasets were used. CNN/DM is summarization data with a high extraction rate of about three texts and XSum is summarization data with a low extraction rate of about one text. Evaluation was performed using ROUGE values that are standardly used in automatic summarization evaluation. The outline of each data is shown in Table 3. The average length of a summary was calculated in units of sub-words into which the dev set of each data is divided with byte-level BPE ("A. Radford et al. Language models are unsupervised multi-task learners. Technical report, OpenAI, 2019.") of fairseq1.

TABLE 3

| set | train | dev | eval | AVERAGE NUMBER OF TOKENS OF SUMMARY |
|---|---|---|---|---|
| CNN/DM | 287,227 | 13,368 | 11,490 | 69.6 |
| XSum | 203,150 | 11,279 | 11,267 | 26.6 |

Learning Settings

Each model was implemented using fairseq. Training was performed with seven NVIDIA V100 32 GB GPUs. The same settings as those of "M. Lewis et al. arXiv, 1910.13461, 2019" were used for CNN/DM training. After confirmation on the XSum training from the authors, the parameter update frequency (UPDATE FREQ) regarding gradient accumulation of the mini-batch among the CNN/DM settings was changed to 2. After the accuracy of the dev set was confirmed, it was determined that the number of words K to be extracted by the content selection unit 11 of the CIT model during training was a value in units of bins of five, into which the length of the correct answer summary is divided, on CNN/DM and was a fixed length of 30 on XSum. During evaluation, the average summary length of the dev set was set to K on CNN/DM and was set to 30 on XSum as during training. On XSum, settings were done such that important word sequences do not include duplicates. Methods of setting K during training include a method of setting K to an arbitrary fixed value, a method of setting an arbitrary threshold value and setting K to a value equal to or higher than the threshold value, and a method of setting K dependent on the length L of the correct answer summary. When training is performed with the setting of K dependent on the length L of the correct answer summary, the summary length can be controlled by changing the length of K during test.

Experimental Results

Tables 4 and 5 show experimental results (ROUGE values of each model) regarding "Does combining importance models improve the summarization accuracy?"

TABLE 4

| models | R1 | R2 | RL |
|---|---|---|---|
| BART (our fine-tuning) | 43.79 | 21.00 | 40.58 |
| MT | 44.58 | 21.46 | 41.32 |
| SE | 44.59 | 21.49 | 41.28 |
| SE + MT | 44.77 | 21.50 | 41.51 |

TABLE 4-continued

| models | R1 | R2 | RL |
|---|---|---|---|
| SA | 44.72 | 21.59 | 41.40 |
| SA + MT | 44.79 | 21.69 | 41.47 |
| CIT | 45.05 | 22.02 | 41.78 |
| CIT + SE | 45.34 | 22.13 | 42.15 |
| CIT + SA | 45.20 | 22.12 | 41.95 |
| SEG | 44.62 | 21.51 | 41.29 |

TABLE 5

| models | R1 | R2 | RL |
|---|---|---|---|
| BART (our fine-tuning) | 45.03 | 21.69 | 36.53 |
| MT | 44.68 | 21.43 | 36.12 |
| SE | 45.35 | 22.00 | 36.81 |
| SE + MT | 43.97 | 20.64 | 35.48 |
| SA | 45.34 | 22.02 | 36.82 |
| SA + MT | 44.67 | 21.41 | 36.15 |
| CIT | 45.33 | 21.92 | 36.68 |
| CIT + SE | <u>45.71</u> | <u>22.30</u> | <u>36.99</u> |
| CIT + SA | <u>45.37</u> | <u>21.94</u> | <u>36.75</u> |
| SEG | 41.03 | 18.20 | 32.75 |

As shown in Tables 4 and 5, CIT+SE gave the best results on both datasets. First, because the CIT alone improved the accuracy, it can be seen that combining important words is excellent as a method of giving important information to the text generation model (the generation unit 12). Because it was confirmed that combining the CIT with the SE and SA models further improved the accuracy, it is thought that the combination with soft weighting achieves an improvement although noise is included in important words.

Both the SE and SA have improved the accuracy. The MT, SE+MT, and SA+MT which simultaneously learn the correct answer of importance have improved the accuracy on CNN/DM, but decreased the accuracy on XSum. This is thought to be due to the effects of the quality of the pseudo-correct answer of importance. In the case of CNN/DM, it is easy to align words when creating a pseudo-correct answer because summaries are relatively long and highly extractive. On the other hand, in the case of XSum data, alignment is difficult and pseudo-correct answers serve as noise because summaries are short and often described in expressions other than those in source text. Even in the CIT, the improvement in accuracy on XSum is smaller than that on CNN/DM due to these effects. However, it can be said that the CIT is a method that operates robustly because it shows the highest performance on all data with different properties.

"Our fine-tuning" indicate the results of fine-tuning (baseline) by the inventors of the present application. Underlines in Table 5 indicate the highest accuracies among the improvements in the baseline models.

Table 6 shows experimental results regarding "how accurate is token extraction of the importance model alone?"

Table 6 shows the results of evaluating the ROUGE values of top token sequences and summary text selected in terms of the importance $p^{ext}$ of the CIT.

TABLE 6

| models | R1 | R2 | RL |
|---|---|---|---|
| | CNN/DM | | |
| Lead3 | 40.3 | 17.7 | 36.6 |
| Presum | 43.25 | 20.24 | 39.63 |
| topK tokens | 46.72 | 20.53 | 37.73 |
| top3 texts | 42.64 | 20.05 | 38.89 |

TABLE 6-continued

| models | R1 | R2 | RL |
|---|---|---|---|
| | XSum | | |
| Lead3 | 16.30 | 1.61 | 11.95 |
| topK tokens | 24.60 | 3.17 | 15.15 |
| top3 texts | 21.98 | 4.09 | 16.95 |

It can be seen that important words are properly identified on CNN/DM. It can be seen that the accuracies are high in R1 and R2 and important elements can be extracted at the word level as compared with Presum ("Y. Liu et al. In EMNLP-IJCNLP, pages 3728-3738, 2019") which is the SOTA in the conventional extractive summarization methods. While there were no significant differences in the importance between words with the internally learned $p^{ext}$ of the SE model or SA model, important words can be explicitly taken into consideration in the present model. On the other hand, the accuracy of the importance model on XSum is low as a whole because XSum is data with a low extraction rate. This is thought to be the reason why the improvement in summarization accuracy is lower than that of CNN/DM. Although the method of giving a pseudo-correct answer verified here was particularly effective on data with a high extraction rate, a further improvement in accuracy even on data with a low extraction rate can be expected by improving the accuracy of the importance model.

Although the above embodiments have been described with respect to a summary generation task as an example, each of the above embodiments may be applied to various other text generation tasks.

In each of the above embodiments, the text generation apparatus 10 for training is an example of a text generation training apparatus.

Although embodiments of the present invention have been described in detail above, the present invention is not limited to such specific embodiments and various modifications and changes can be made within the scope of the spirit of the present invention described in the claims.

REFERENCE SIGNS LIST

10 Text generation apparatus
11 Content selection unit
12 Generation unit
13 Parameter learning unit
14 Search unit
15 Content selection coding unit
20 Knowledge source database
100 Drive device
101 Recording medium
102 Auxiliary storage device
103 Memory device
104 CPU
105 Interface device
121 Source text encoding unit
122 Reference text encoding unit
123 Decoding unit
124 Synthesis unit
125 Joint encoding unit
126 Encoding unit
B Bus

The invention claimed is:

1. A text generation apparatus comprising:
a memory; and
a processor configured to:
determine, based on a predetermined measure, a score associated with each word in an input text using a first neural network, the score being high for the each word to be included in an output text, and the score being low for the each word to be not included in the output text;

extract, based on the score, a first set of words from the input text;

generate a reference text, wherein the reference text includes a second set of words being selected from the first set of words in a descending order of the score, and a number of the second set of words is the same number of words included in the output text; and generate the output text based on the input text and the reference text using a second neural network, wherein the output text summarizes the input text using at least a part of words in the reference text, the second neural network includes an input text encoding and a reference text encoding as distinct text encodings cross-referencing each other in a multi-layered network.

2. The text generation apparatus according to claim 1, wherein the reference text includes information indicating a length of the output text generated by the generating, and the generating the reference text further comprises:
determining a number of appearances associated with each word of the input text and to select a word to be included in the reference text based on both the number of appearances and information based on the length of the output text.

3. The text generation apparatus according to claim 1, wherein the predetermined measure includes a probability of the each word of the input text to included in a summary of the input text.

4. The text generation apparatus according to claim 1, wherein the second neural network includes a Transformer dual encoder block, the Transformer dual encoder block encodes the input text and the reference text, and the Transformer dual encoder block further performs multi-head attention between an encoded input text and an encoded reference text as the cross-referencing.

5. A text generation training apparatus comprising:
a memory; and
a processor configured to:
determine, based on a predetermined measure, a score associated with each word in an input text using a first neural network based on learned first parameters, the score being high for the each word to be included in an output text, and the score being low for the each word to be not included in the output text;

extract, from the input text, a first set of words in a descending order of the score;

generate a reference text, wherein the reference text includes a second set of words being selected from the first set of words in the descending order of the score, and a number of the second set of words is the same as a number of words included in the output text;

generate, based on the input text and the reference text, the output text using a second neural network based on learned second parameters, wherein the output text summarizes the input text using at least a part of words in the reference text; and learn the learned first parameters associated with the first neural network; and learn the learned second parameters associated with the second neural network, wherein and the second neural network includes an input text encoding and a reference text encoding as distinct text encodings cross-referencing each other in a multi-layered network.

6. A text generation apparatus comprising:
a memory; and
a processor configured to:
determine, based on a predetermined measure, a score associated with each word in an input text using a first neural network based on learned first parameters, the score being high for the each word to be included in an output text, and the score being low for the each word to be not included in the output text extract, from the input text, a first set of words in a descending order of the score;

generate a reference text, wherein the reference text includes a second set of words being selected from the first set of words in the descending order of the score, and a number of the second set of words is the same as a number of words included in the output text; and generate, based on the input text and the reference text, the output text using a second neural network based on learned second parameters, wherein the output text summarizes the input text using at least a part of words in the reference text, and the second neural network includes an input text encoding and a reference text encoding as distinct text encodings cross-referencing each other in a multi-layered network.

7. A text generation training apparatus comprising:
a memory; and
a processor configured to:
determine, based on a predetermined measure, a score associated with each word in an input text using a first neural network associated with learned first parameters, the score being high for the each word to be included in an output text, and the score being low for the each word to be not included in the output text;

extract, from the input text, a first set of words in a descending order of the score;

generate a reference text, wherein the reference text includes a second set of words being selected from the first set of words in the descending order of the score, and a number of the second set of words is the same as a number of words included in the output text;

generate, based on the input text and the reference text, the output text using a second neural network based on learned second parameters, wherein the output text summarizes the input text using at least a part of words in the reference text; and learn the learned first parameters associated with the first neural network; and learn the learned second parameters associated with the second neural network;

wherein the second neural network includes an input text encoding and a reference text encoding as distinct text encodings cross-referencing each other in a multi-layered network.

8. A non-transitory computer-readable recording medium having computer-readable instructions stored thereon, which when executed, cause a computer including a memory and a processor to execute processing as the text generation apparatus according to claim 1.

9. A non-transitory computer-readable recording medium having computer-readable instructions stored thereon, which when executed, cause a computer including a memory and a processor to execute processing as the text generation training apparatus according to claim 5.

10. A text generation apparatus comprising:
a memory; and
a processor configured to:
determine, based on a predetermined measure, a score associated with each word in an input text using a first neural network based on learned first parameters, the score being high for the each word to be included in an output text, and the score being low for the each word to be not included in the output text;

extract, from the input text, a first set of words in a descending order of the score;

generate a reference text, wherein the reference text includes a second set of words selected from the first set of words, the second set of words being selected from the first set of words in the descending order of the score, and a number of the second set of words is the same as a number of words included in the output text; and generate, based on the reference text, the output text using a second neural network based on learned second parameters,
wherein the output text summarizes the input text using at least a part of words in the reference text.

11. A text generation training apparatus comprising:
a memory; and
a processor configured to:
determine, based on numbers of appearances associated with each word in an input text, a score associated with the each word in the input text using a first neural network based on learned first parameters;
extract a first set of words according to the score, wherein the first set of words includes words in a descending order of a number of times of the words appearing in the input text;
generate a reference text, wherein the reference text includes a second set of words selected from the input text according to the score, and a number of words in the reference text is the same as a number of words to appear in an output text, and an order of words in the reference text is according to an order of the words appearing in the input text;
generate, based on the reference text, the output text using a second neural network based on learned second parameters, wherein the output text summarizes the input text using at least a part of words in the reference text;
learn the learned first parameters associated with the first neural network; and
learn the learned second parameters associated with the second neural network;
wherein, the second neural network includes an input text encoding and a reference text encoding as distinct text encodings cross-referencing each other in a multi-layered network, and the second neural network further includes decoding a combination of the input text encoding and a reference text encoding according to a combination of a self-attention and a content attention.

12. A computer-readable non-transitory recording medium storing computer-executable program instructions that when executed by a processor cause a computer system to execute operations as the text generation apparatus according to claim 10.

13. A computer-readable non-transitory recording medium storing computer-executable program instructions that when executed by a processor cause an apparatus to execute operations as the text generation training apparatus according to claim 11.

* * * * *